(12) United States Patent
Verheyden

(10) Patent No.: US 11,002,920 B2
(45) Date of Patent: *May 11, 2021

(54) FIBER OPTIC CONNECTION SYSTEM

(71) Applicant: COMMSCOPE CONNECTIVITY BELGIUM BVBA, Kessel-Lo (BE)

(72) Inventor: Danny Willy August Verheyden, Gelrode (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,555

(22) Filed: May 30, 2019

(65) Prior Publication Data

US 2019/0346631 A1    Nov. 14, 2019

Related U.S. Application Data

(63) Continuation of application No. 15/775,798, filed as application No. PCT/EP2016/077511 on Nov. 11, 2016, now Pat. No. 10,310,190.

(Continued)

(51) Int. Cl.
*G02B 6/38* (2006.01)
*G02B 6/44* (2006.01)

(52) U.S. Cl.
CPC ......... *G02B 6/3849* (2013.01); *G02B 6/3809* (2013.01); *G02B 6/3823* (2013.01); *G02B 6/3825* (2013.01); *G02B 6/4471* (2013.01)

(58) Field of Classification Search
CPC .. G02B 6/3849; G02B 6/3809; G02B 6/3823; G02B 6/3825; G02B 6/4471
See application file for complete search history.

(56) References Cited

U.S. PATENT DOCUMENTS 4,674,831 A * 6/1987 Bagby .................. G02B 6/3574
   385/19
5,004,318 A * 4/1991 Ohashi ................... G02B 6/352
   385/19

(Continued)

FOREIGN PATENT DOCUMENTS

EP    1 122 565 A1    8/2001
GB    2 510 566 A     8/2014

(Continued)

OTHER PUBLICATIONS

International Search Report and Written Opinion of the International Searching Authority for corresponding International Patent Application No. PCT/EP2016/077511 dated Jan. 24, 2017, 12 pages.

(Continued)

*Primary Examiner* — Peter Radkowski
(74) *Attorney, Agent, or Firm* — Merchant & Gould P.C.

(57) ABSTRACT

A fiber optic connection system (10/182/252) includes a first connection component (12/166/184/194/202/230/254) terminating a first fiber optic cable (14), the first connection component (12/166/184/194/202/230/254) including a housing (24/170/214/244/260) defining a longitudinal axis, at least one fiber (20) of the first fiber optic cable (14) fixed axially to the housing (24/170/214/244/260). A first shutter (36/206/238) is slidably movable in a direction generally perpendicular to the longitudinal axis of the housing (24/170/214/244/260), the first shutter (36/206/238) biased to a closed position to prevent exposure to the at least one fiber (20) of the first fiber optic cable (14). The first connection component (12/166/184/194/202/230/254) includes a second shutter (22/100/172/212/242/258) slidably movable in a direction generally parallel to the longitudinal axis, the second shutter (22/100/172/212/242/258) biased to a closed (Continued)

position to prevent the at least one fiber (20) from protruding from the first connection component (12/166/184/194/202/230/254).

30 Claims, 43 Drawing Sheets

Related U.S. Application Data

(60) Provisional application No. 62/254,867, filed on Nov. 13, 2015.

(56) References Cited

U.S. PATENT DOCUMENTS

| | | | | | |
|---|---|---|---|---|---|
| 5,035,482 | A | * | 7/1991 | ten Berge | G02B 6/3508 385/16 |
| 5,080,461 | A | * | 1/1992 | Pimpinella | G02B 6/32 385/35 |
| 6,351,580 | B1 | * | 2/2002 | Dhuler | B81B 3/0054 385/136 |
| 6,385,365 | B1 | * | 5/2002 | Rosete | G02B 6/3504 385/16 |
| 6,951,425 | B2 | * | 10/2005 | Vergeest | G02B 6/3809 385/59 |
| 7,213,974 | B2 | * | 5/2007 | Kiani | G02B 6/30 385/55 |
| 7,561,763 | B2 | * | 7/2009 | Kiani | G02B 6/30 385/14 |
| 7,646,947 | B2 | * | 1/2010 | Yen | G02B 6/3508 385/22 |
| 7,927,023 | B2 | * | 4/2011 | Moriarty | G02B 6/3809 385/139 |
| 8,297,853 | B2 | * | 10/2012 | Katagiyama | G02B 6/3893 385/58 |
| 8,385,694 | B2 | * | 2/2013 | Griffioen | G02B 6/3508 385/16 |
| 9,568,687 | B2 | | 2/2017 | Sato et al. | |
| 9,625,657 | B2 | | 4/2017 | Ott | |
| 9,638,868 | B2 | | 5/2017 | Ott | |
| 2004/0071407 | A1 | * | 4/2004 | Vergeest | G02B 6/3873 385/58 |
| 2004/0223701 | A1 | * | 11/2004 | Tanaka | G02B 6/3897 385/55 |
| 2006/0002665 | A1 | * | 1/2006 | Kiani | G02B 6/30 385/92 |
| 2006/0094273 | A1 | * | 5/2006 | Mine | G02B 6/3849 439/137 |
| 2007/0286555 | A1 | * | 12/2007 | Kiani | G02B 6/30 385/72 |
| 2008/0267558 | A1 | * | 10/2008 | Yen | G02B 6/3508 385/22 |
| 2010/0067850 | A1 | * | 3/2010 | Griffioen | G02B 6/3508 385/16 |
| 2010/0209053 | A1 | * | 8/2010 | Moriarty | G02B 6/4219 385/81 |
| 2010/0303417 | A1 | * | 12/2010 | Katagiyama | G02B 6/3849 385/60 |
| 2012/0033920 | A1 | | 2/2012 | Haley et al. | |
| 2014/0024235 | A1 | * | 1/2014 | Russell | H01R 13/5213 439/137 |
| 2014/0072265 | A1 | | 3/2014 | Ott | |
| 2014/0219624 | A1 | | 8/2014 | Miller | |
| 2015/0241640 | A1 | | 8/2015 | Sato et al. | |

FOREIGN PATENT DOCUMENTS

| | | |
|---|---|---|
| JP | 2004-170544 A | 6/2004 |
| WO | 00/67055 A1 | 11/2000 |
| WO | 2012/112344 A1 | 8/2012 |
| WO | 2013/117598 A2 | 8/2013 |
| WO | 2015/048198 A1 | 4/2015 |
| WO | 2016/043922 A1 | 3/2016 |
| WO | 2016/100384 A1 | 6/2016 |
| WO | 2017/081300 A1 | 5/2017 |

OTHER PUBLICATIONS

"The 3M™ Volition™ VF-45™ Interconnect an Emerging Standard for High-Speed Fiber to the Desktop", 3M Telecom System Division, 18 pages (admitted as prior art as of Nov. 13, 2015).

* cited by examiner

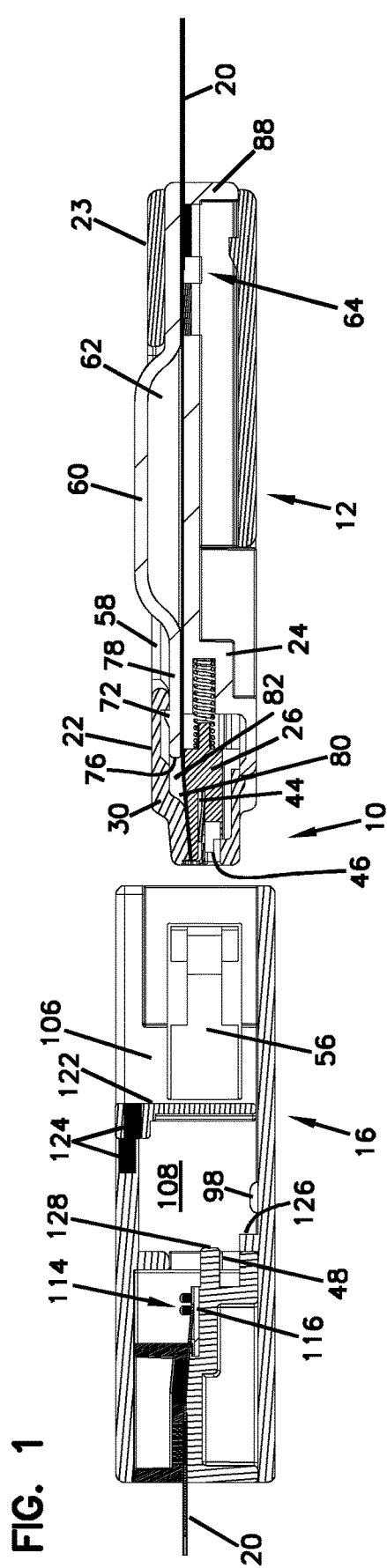
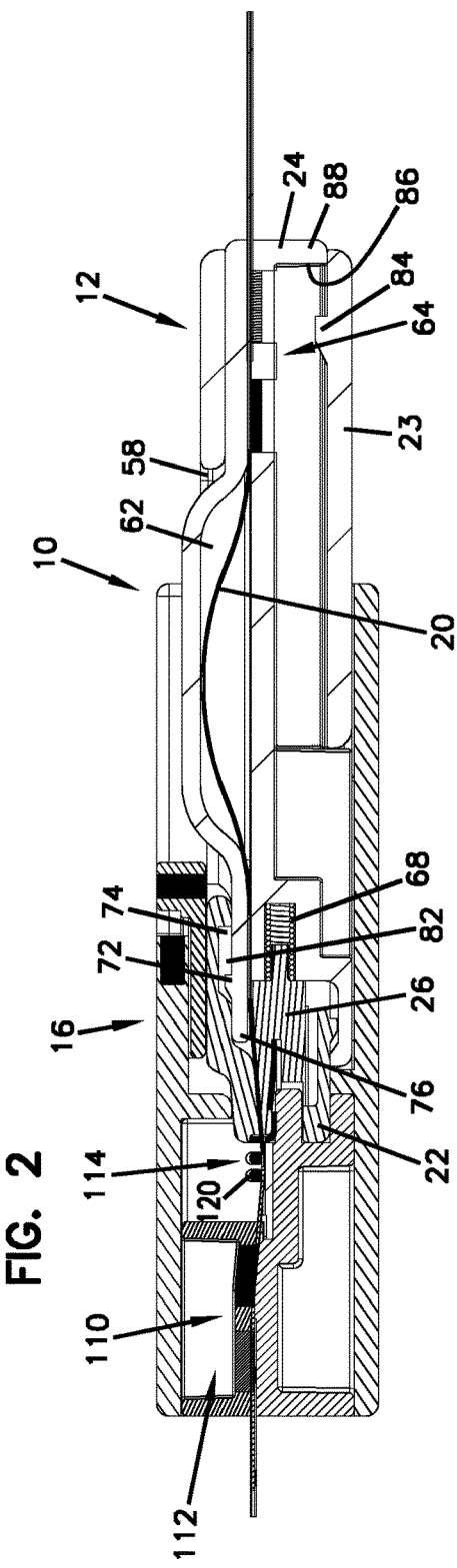
FIG. 1
FIG. 2

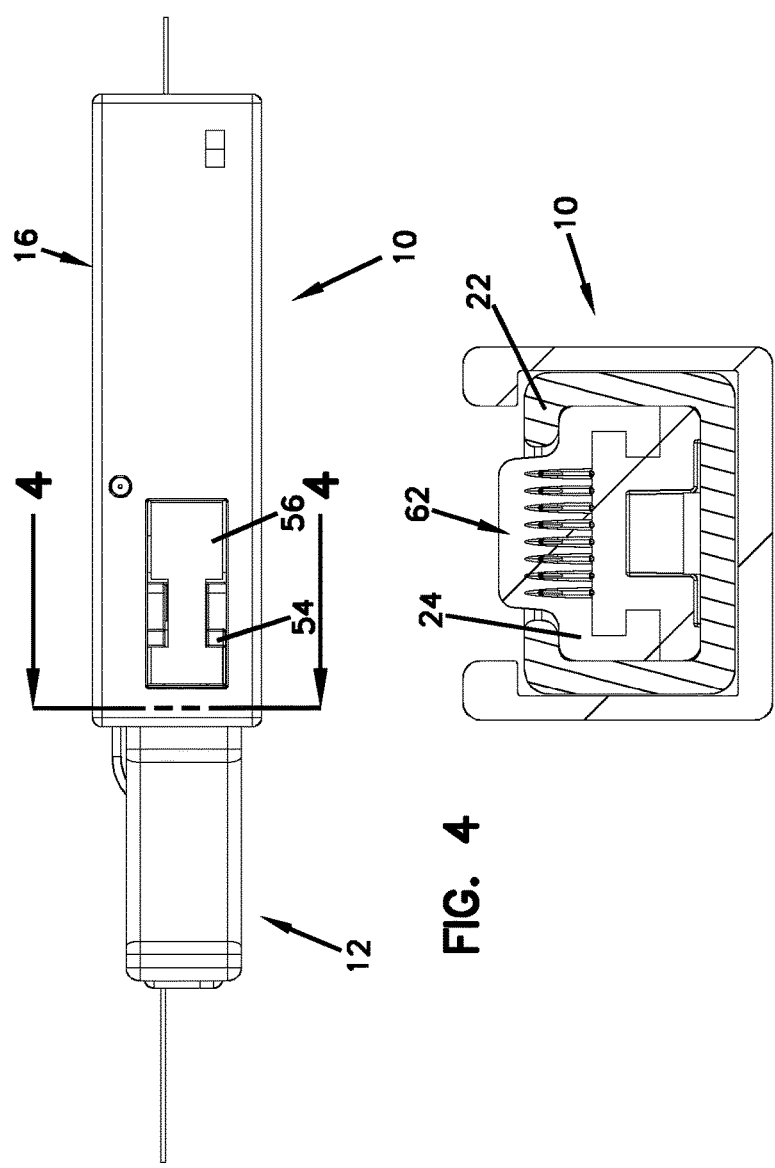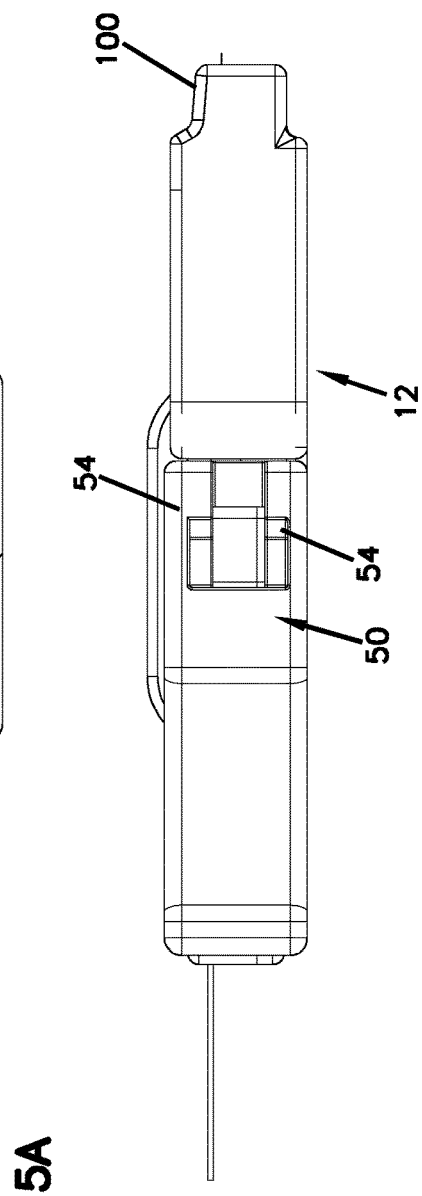
FIG. 3
FIG. 4
FIG. 5A

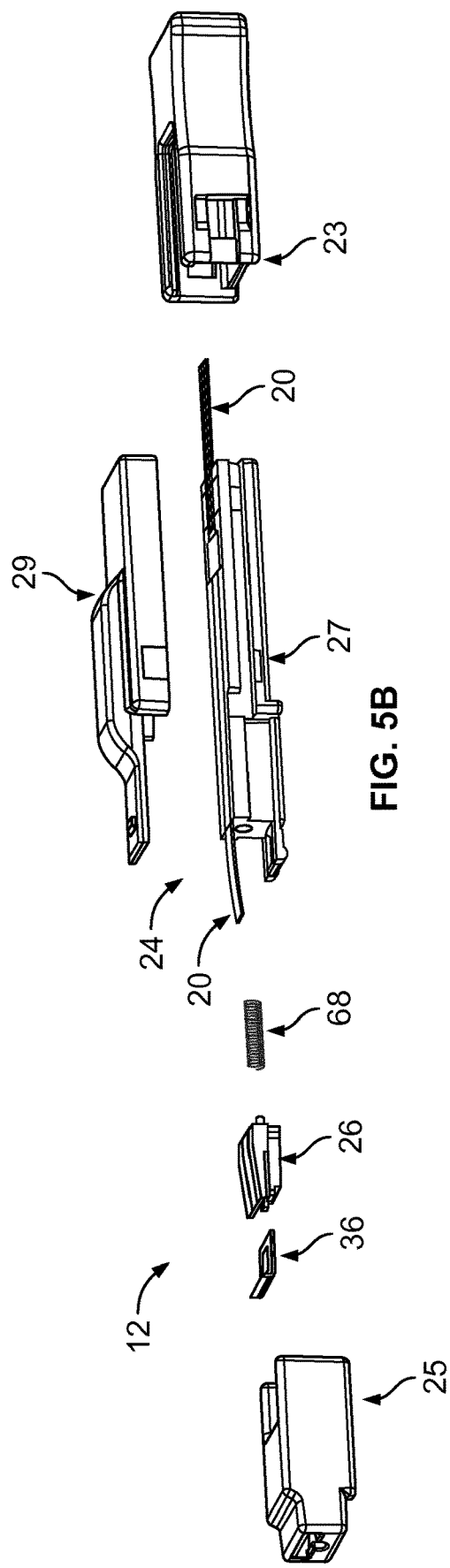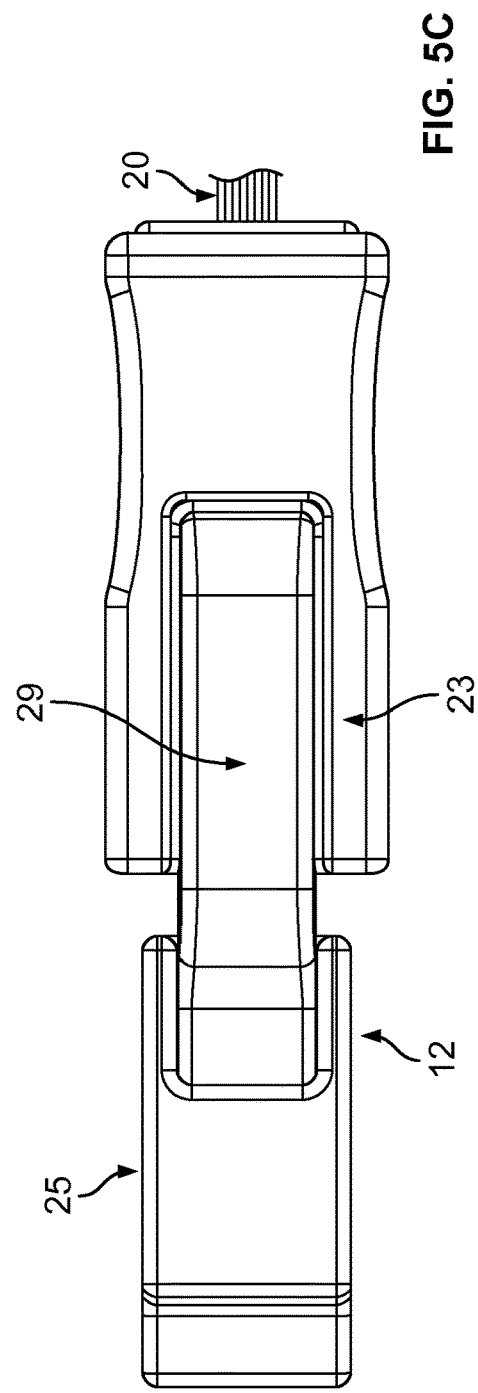

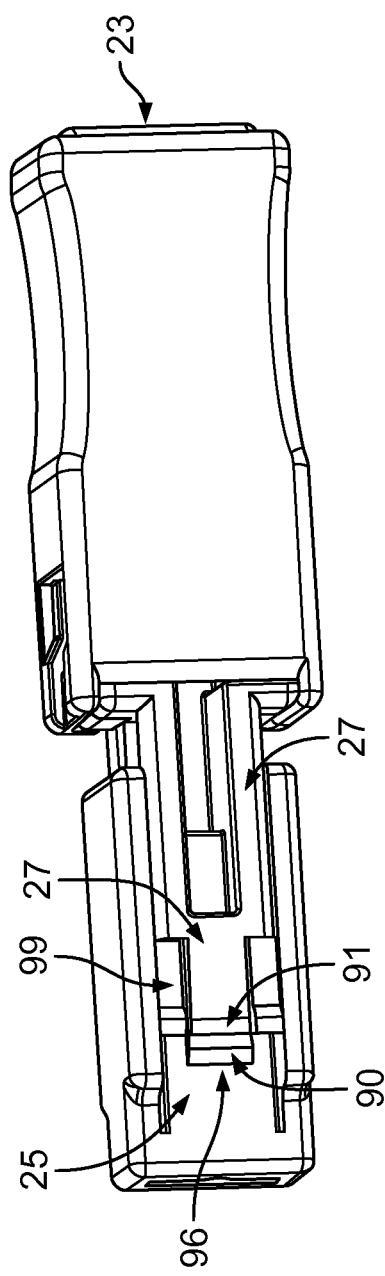
FIG. 5D
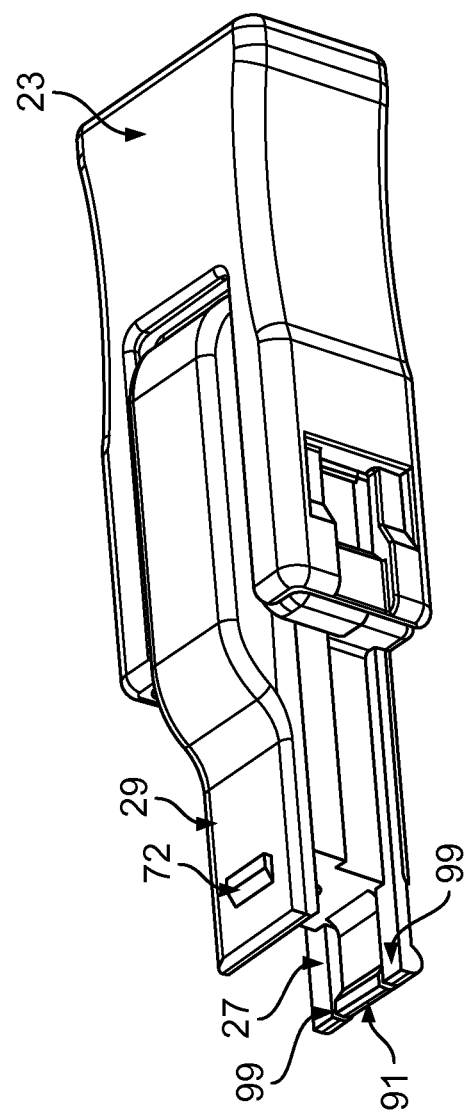
FIG. 5E
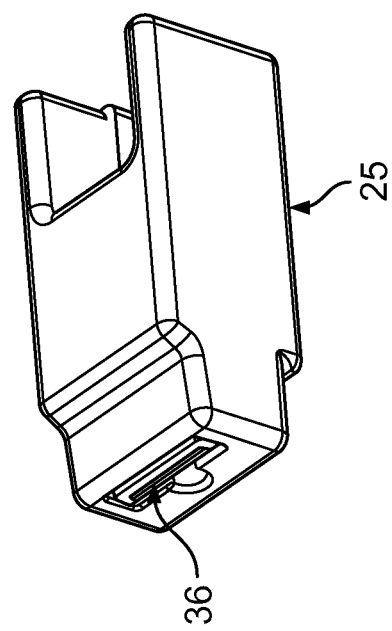

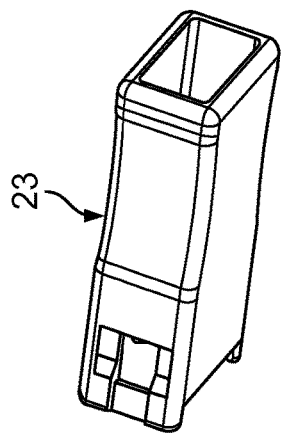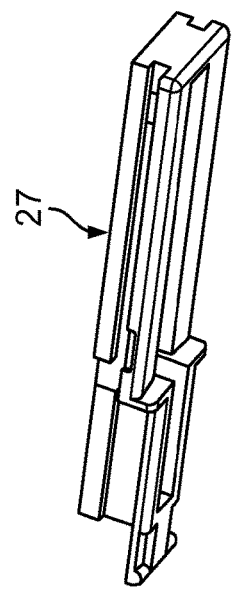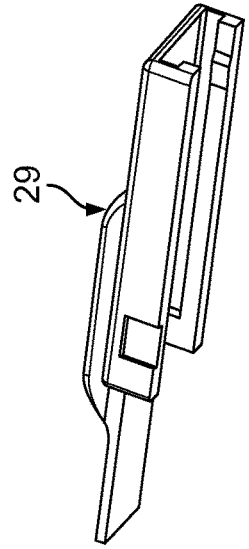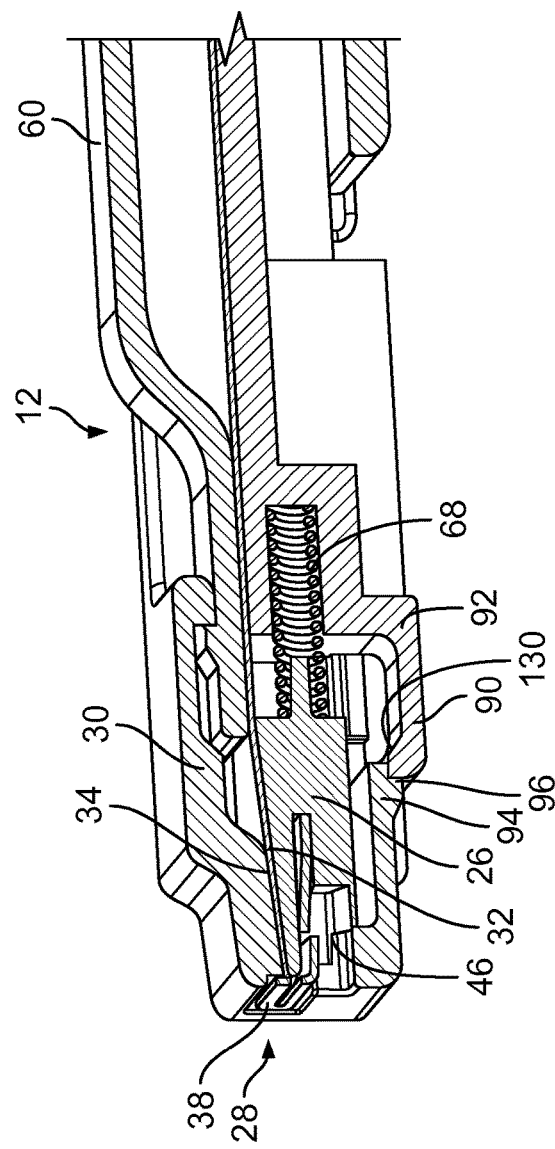
FIG. 5F
FIG. 6

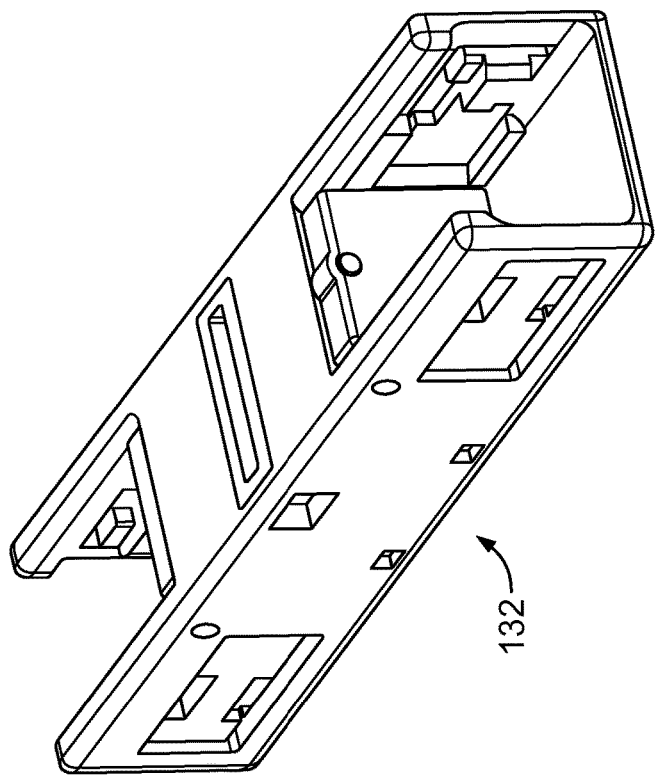
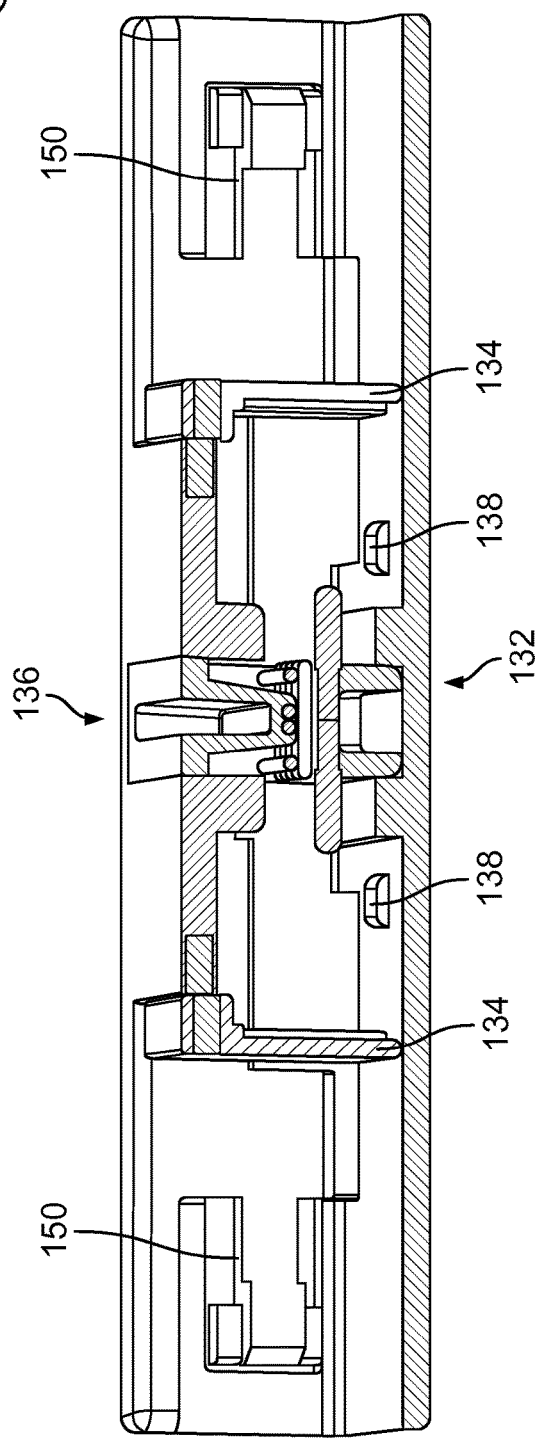

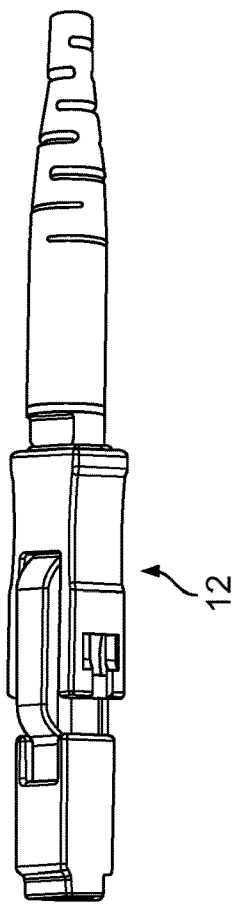
FIG. 24
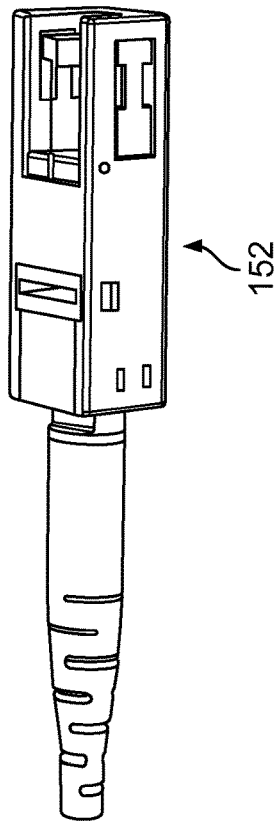
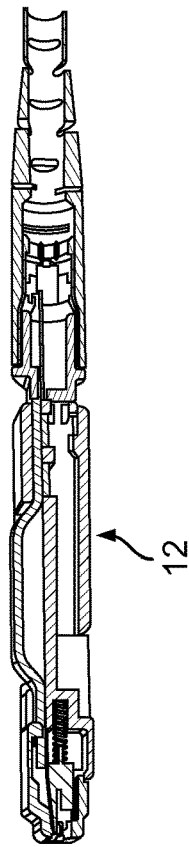
FIG. 25
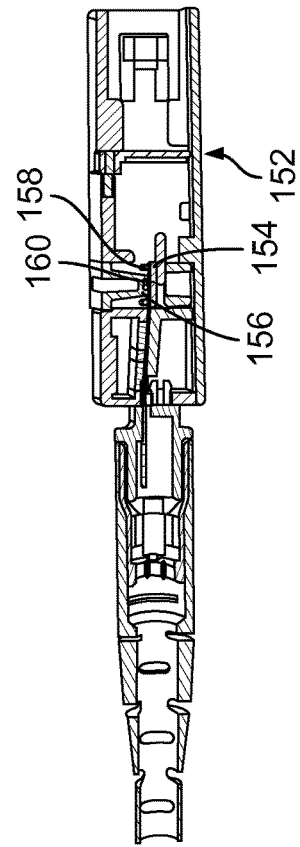

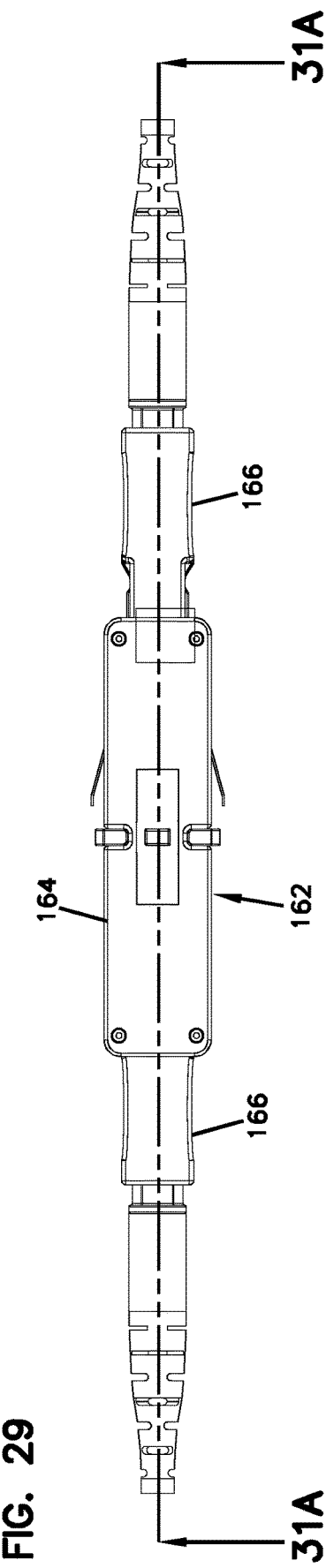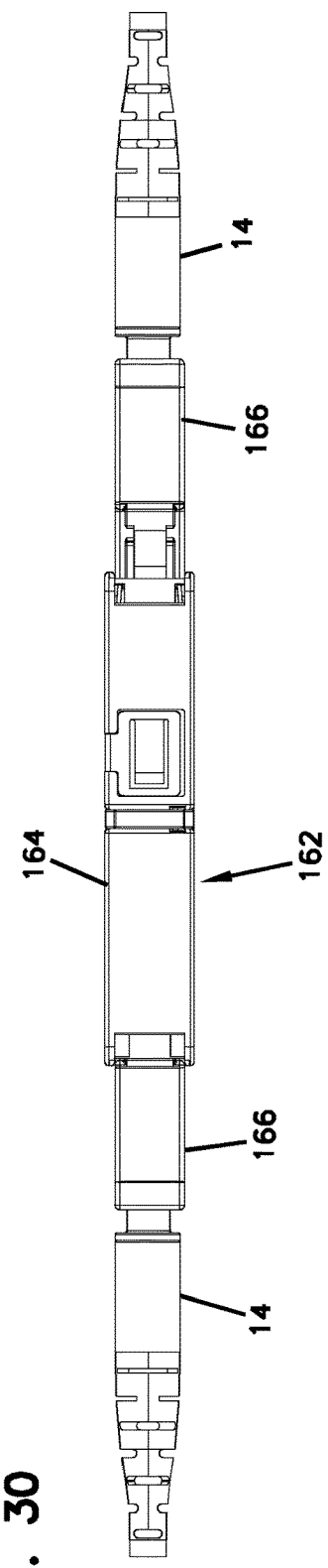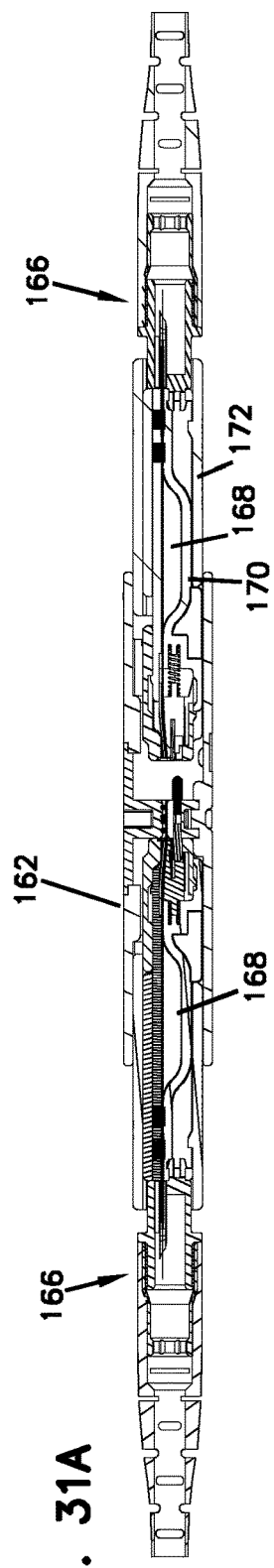

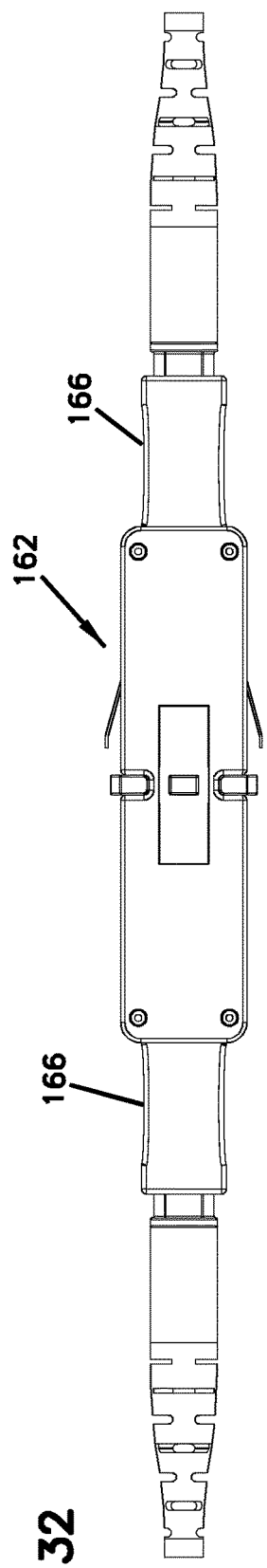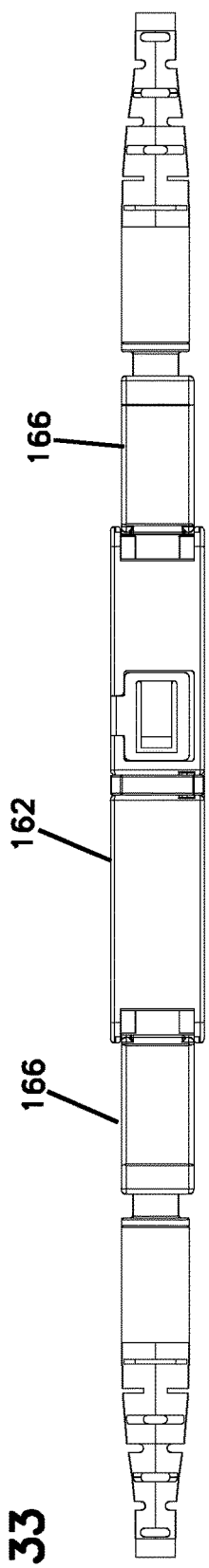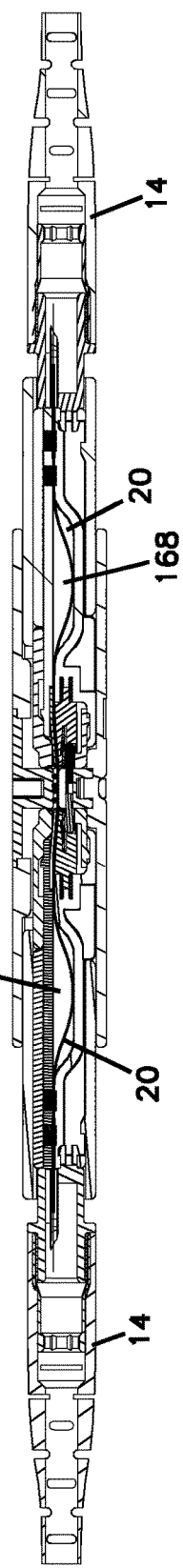

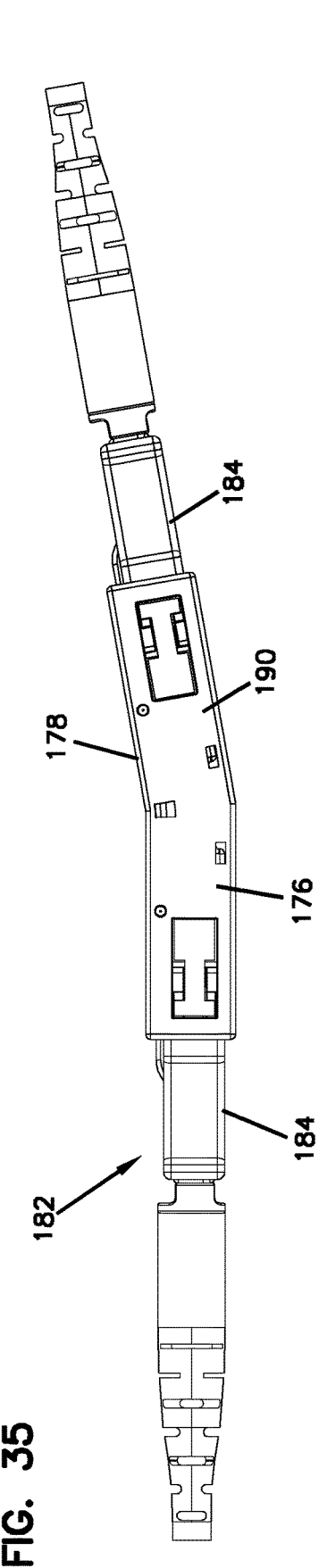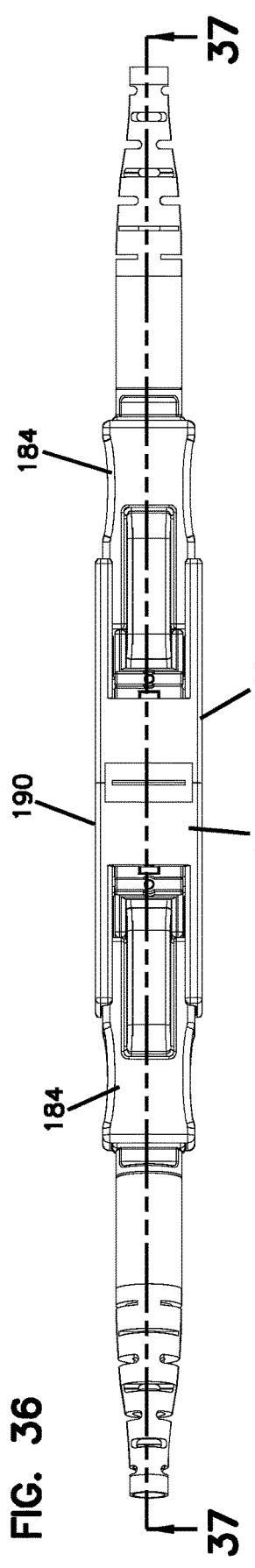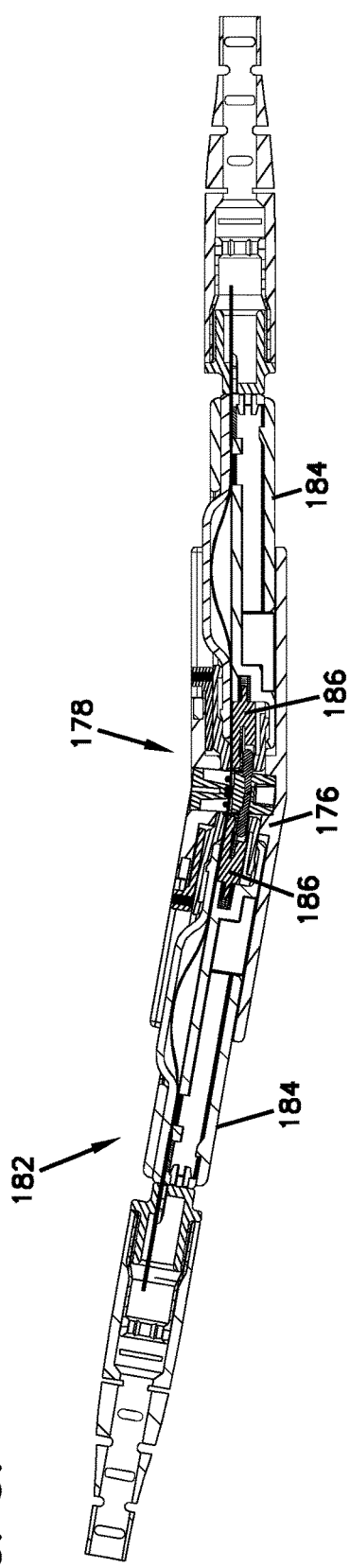

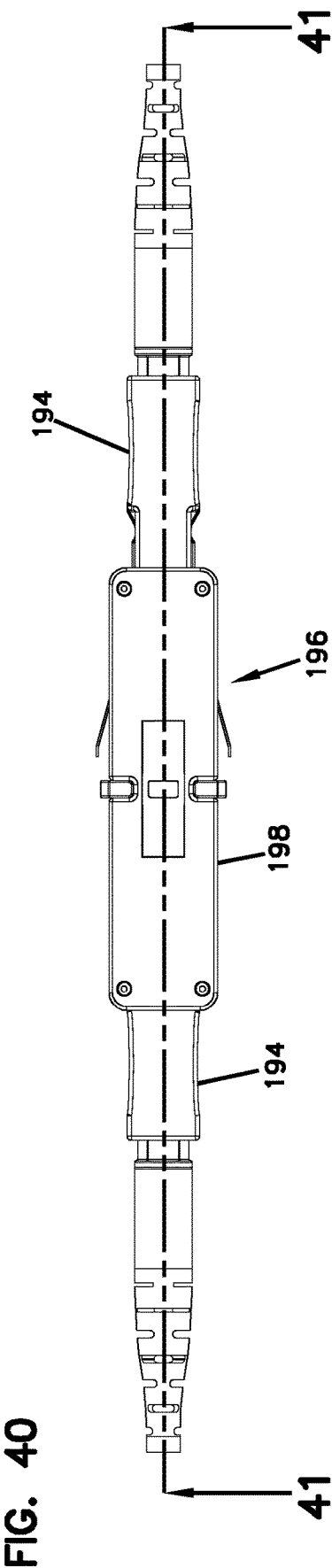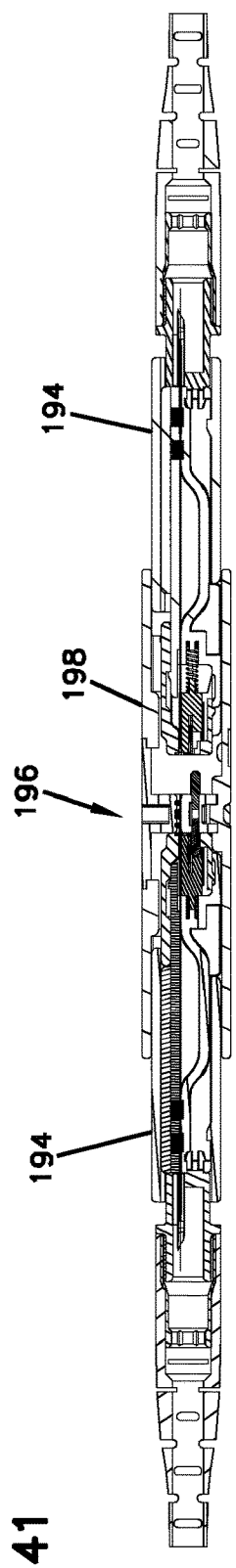
FIG. 40
FIG. 41

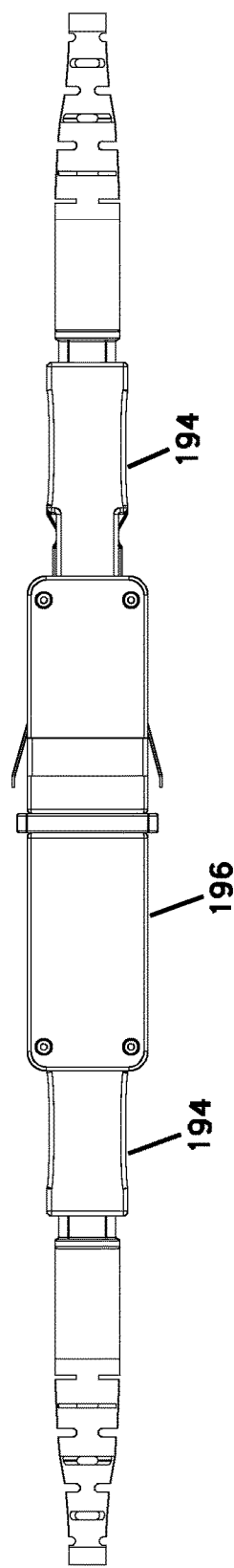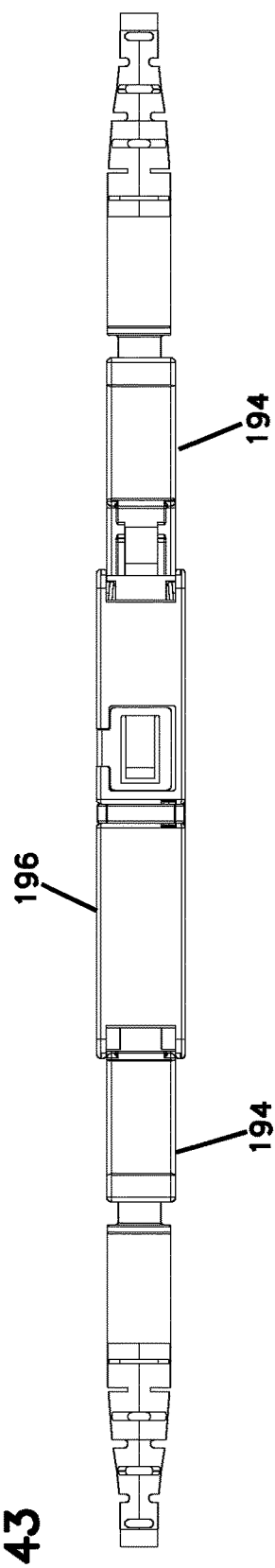
FIG. 42
FIG. 43

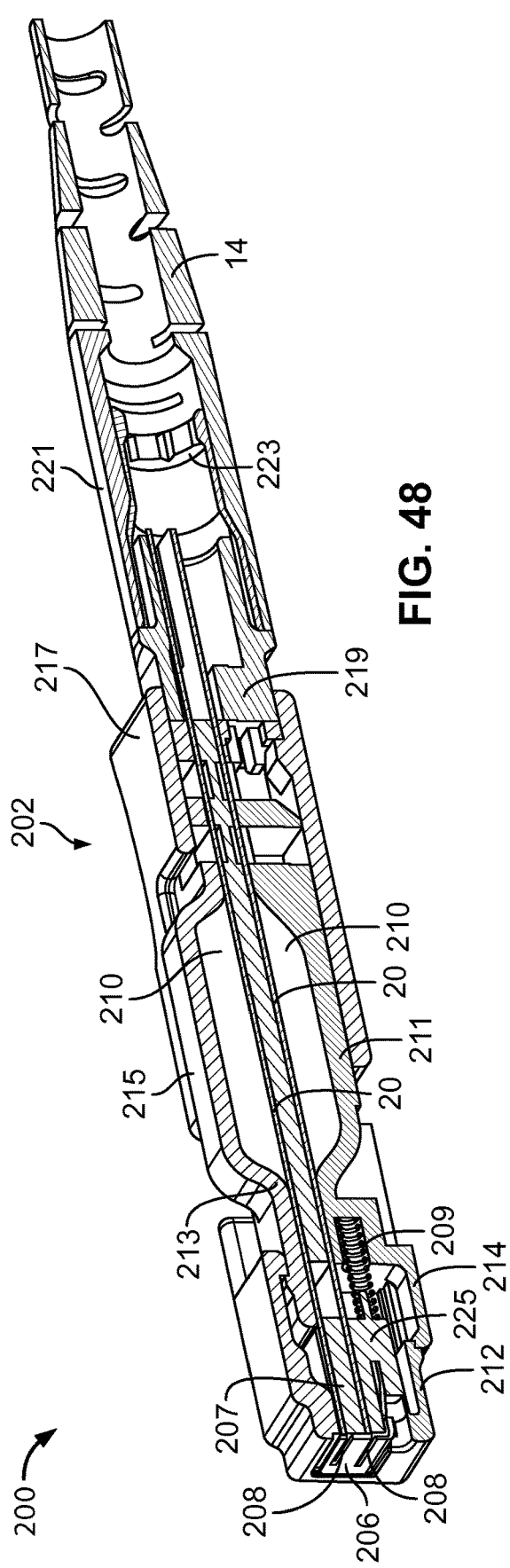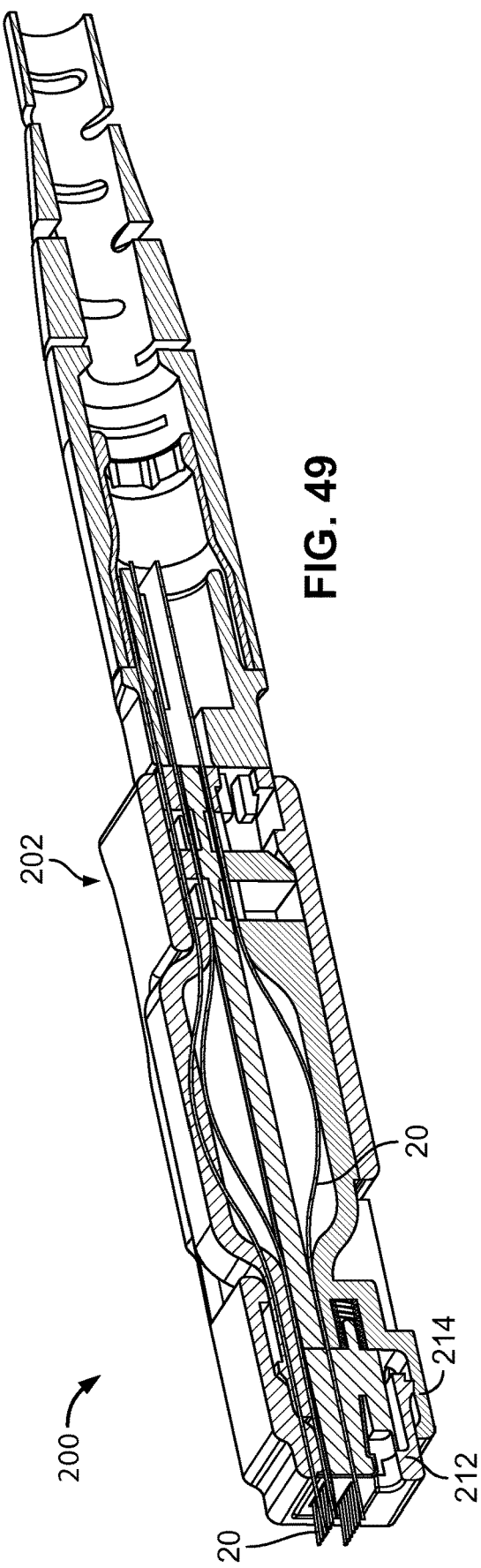

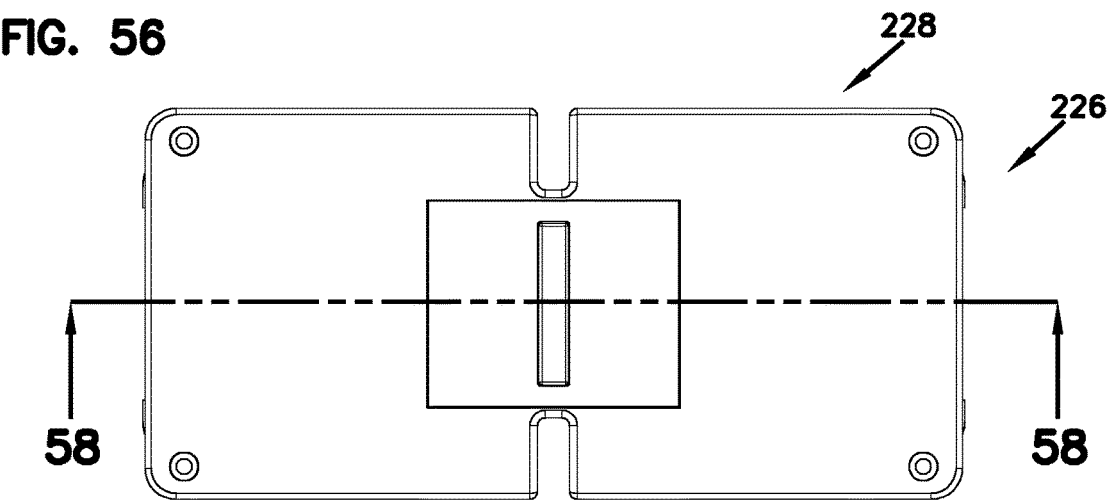
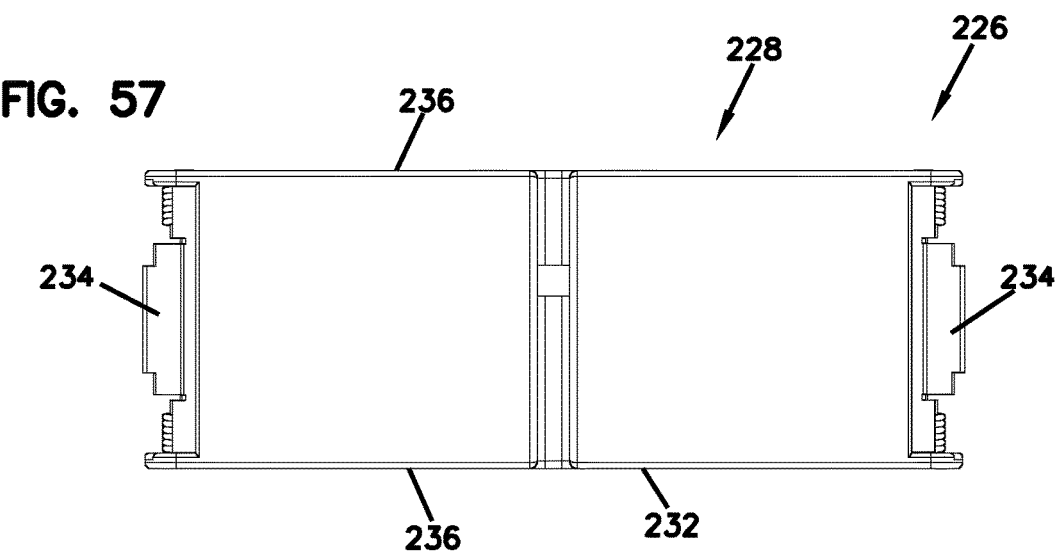
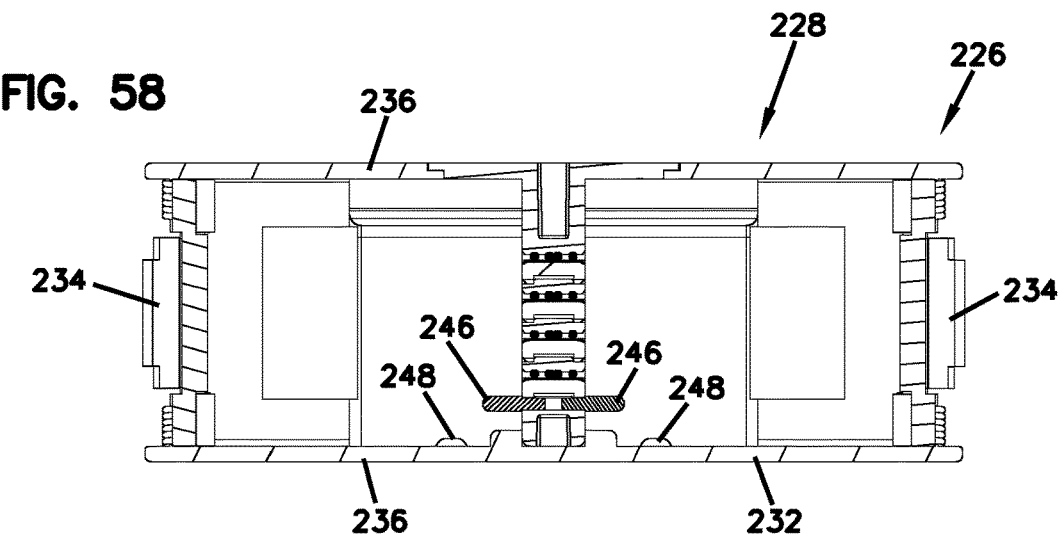

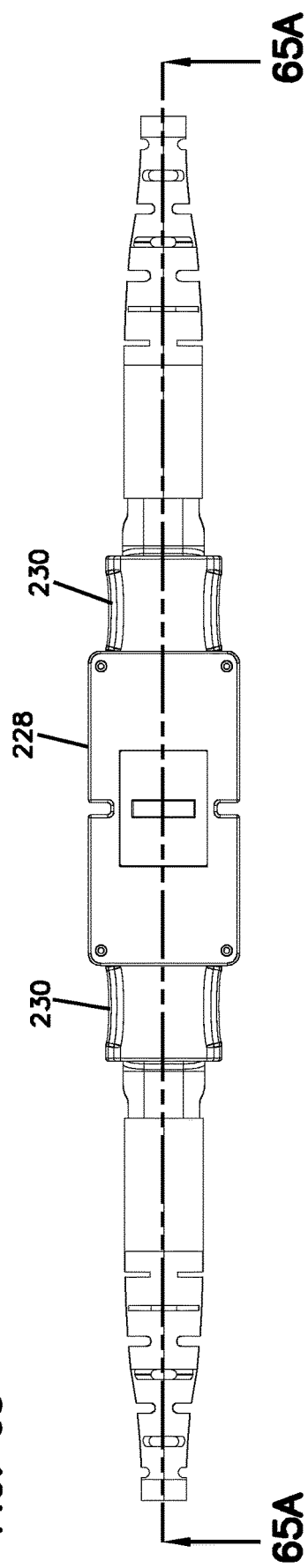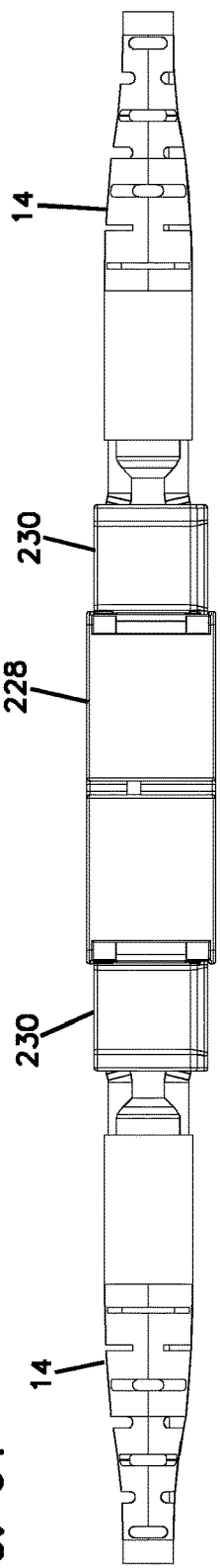
FIG. 63
FIG. 64

FIBER OPTIC CONNECTION SYSTEM

CROSS-REFERENCE TO RELATED APPLICATION

This application is a Continuation of U.S. patent application Ser. No. 15/775,798, filed on May 11, 2018, now U.S. Pat. No. 10,310,190, which is a National Stage Application of PCT/EP2016/077511, filed on Nov. 11, 2016, which claims the benefit of U.S. Patent Application Ser. No. 62/254,867, filed on Nov. 13, 2015, the disclosures of which are incorporated herein by reference in their entireties. To the extent appropriate, a claim of priority is made to each of the above disclosed applications.

BACKGROUND

The present disclosure relates generally to a fiber optic connection system. Modern optical devices and optical communications systems widely use fiber optic cables. Fiber optic cables are often used to transmit light signals for high speed data transmission. A fiber optic cable typically includes an optical fiber or optical fibers, a buffer or buffers that surround the fiber or fibers, a strength layer that surrounds the buffer or buffers, and an outer jacket. The optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel, and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles for receiving the fiber optic connectors desired to be interconnected). The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. Some systems are known which include alignment of fibers but no ferrules.

Improvements in the area of fiber optic connection are desired.

SUMMARY

In one implementation, a fiber optic connection system includes a first connection component terminating a first fiber optic cable, the first connection component including a housing defining a longitudinal axis, at least one fiber of the first fiber optic cable fixed axially with respect to the housing. The first connection component includes a first shutter that is slidably movable in a direction generally perpendicular to the longitudinal axis, the first shutter biased to a closed position wherein the at least one fiber of the first fiber optic cable is prevented from exposure by the first shutter. The first connection component also includes a second shutter that is slidably movable in a direction generally parallel to the longitudinal axis, the second shutter biased to a closed position so as to prevent the at least one fiber of the first fiber optic cable from protruding from the first connection component.

According to another aspect, the disclosure is directed to a method of exposing at least one fiber of a first fiber optic cable for optical alignment with at least one fiber of a second fiber optic cable, the method comprising physically mating a first connection component that terminates the at least one fiber of the first fiber optic cable with a second connection component, automatically moving a first shutter of the first connection component to an open position to expose the at least one fiber of the first fiber optic cable by mating the first connection component to the second connection component, wherein the first shutter is normally biased to a closed position and is slidably movable in a direction generally perpendicular to a longitudinal axis of the first connection component, and automatically moving a second shutter of the first connection component to an open position to expose the at least one fiber of the first fiber optic cable by mating the first connection component to the second connection component, wherein the second shutter is normally biased to a closed position and is slidably movable in a direction generally parallel with respect to the longitudinal axis of the first connection component.

According to another aspect, the disclosure is directed to a fiber optic connection component comprising a housing for physically mating with a housing of another fiber optic connection component terminating at least one fiber of a first fiber optic cable, a first deflection structure for moving a first shutter of the another fiber optic connection component in a direction generally perpendicular to a longitudinal axis of the housing of the another fiber optic connection component, a second deflection structure for moving a second shutter of the another fiber optic connection component in a direction generally along the longitudinal axis of the housing of the another fiber optic connection component, and a fiber alignment structure defining at least one v-groove for receiving the at least one fiber of the first fiber optic cable.

BRIEF DESCRIPTION OF THE FIGURES

FIG. 1 is a cross-sectional view of a fiber optic connection system having features that are examples of inventive aspects in accordance with the disclosure, the cross-sectional view taken along a line bisecting a first connection component in the form of a male connector and a second connection component in the form of a female connector of the connection system;

FIG. 2 illustrates the male and female connectors of FIG. 1 in a mated configuration;

FIG. 3 is a side view illustrating the male and female connectors of FIG. 2;

FIG. 4 is a cross-sectional view taken along line 4-4 of FIG. 3;

FIG. 5A is a side view of the male connector of FIGS. 1-3;

FIG. 5B is an exploded view of the male connector of FIGS. 1-3;

FIG. 5C is a top view of the male connector of FIGS. 1-3;

FIG. 5D is a bottom perspective view of the male connector of FIGS. 1-3;

FIG. 5E is another partially exploded view of the male connector of FIGS. 1-3;

FIG. 5F illustrates the connector inner housing base, the connector inner housing top, and the connector sliding outer housing of the male connector of FIGS. 1-3 in an exploded configuration;

FIG. 6 is a partial perspective cross-sectional view of the male connector of FIG. 5, the cross-sectional view taken along a line bisecting the male connector, the male connector shown with both of the first shutter and the second shutter in a closed position;

FIG. 21 is a perspective view of the adapter of FIGS. 16-20;

FIG. 22 is a cross-sectional view of the adapter of FIG. 21, the cross-sectional view taken along a line bisecting the adapter;

FIG. 24 is a perspective view of another fiber optic connection system including the male connector of FIGS. 5-8 and another embodiment of a female connector that is configured to mate with the male connector;

FIG. 25 illustrates a cross-sectional view of the male and female connectors of FIG. 24, the cross-sectional view taken along a line bisecting the male and female connectors;

FIG. 29 is a top view of another fiber optic connection system including an adapter configured to fit within an SC footprint and a pair of male connectors to be mated therethrough, wherein one of the male connectors is shown as partially inserted within the adapter;

FIG. 30 is a side view of the fiber optic connection system of FIG. 29;

FIG. 31A is a cross-sectional view of the fiber optic connection system of FIGS. 29-30, the cross-sectional view taken along line 31A-31A of FIG. 29 that bisects the adapter and the male connectors;

FIG. 32 illustrates a top view of the fiber optic connection system of FIG. 29 with both of the male connectors fully mated through the adapter;

FIG. 33 illustrates a side view of the fiber optic connection system of FIG. 32;

FIG. 34 is a cross-sectional view of the fiber optic connection system of FIGS. 32-33, the cross-sectional view taken along a line bisecting the adapter and the male connectors;

FIG. 35 is a side view of another fiber optic connection system including an adapter defining an angled body and a pair of male connectors to be mated therethrough;

FIG. 36 illustrates a top view of the fiber optic connection system of FIG. 35;

FIG. 37 is cross-sectional view of the fiber optic connection system of FIGS. 35-36, the cross-sectional view taken along line 37-37 of FIG. 36 that bisects the adapter and the male connectors;

FIG. 40 is a top view of yet another fiber optic connection system including an adapter configured to fit within an SC footprint and another pair of male connectors to be mated therethrough, wherein the fibers of the male connectors protrude therefrom at a straight, non-angled orientation, wherein one of the male connectors is shown as partially inserted within the adapter;

FIG. 41 is a cross-sectional view of the fiber optic connection system of FIG. 40, the cross-sectional view taken along line 41-41 of FIG. 40 that bisects the adapter and the male connectors;

FIG. 42 is a bottom view of the fiber optic connection system of FIGS. 40-41;

FIG. 43 is a side view of the fiber optic connection system of FIGS. 40-42;

FIG. 48 is a perspective cross-sectional view of another embodiment of a first connection component in the form of a male connector, the cross-sectional view taken along a plane running generally perpendicular to the longitudinal axis of the male connector, the male connector provided in the form of a dual-layered fiber connection component, the male connector shown with both of the first shutter and the second shutter in a closed position;

FIG. 49 illustrates a cross-sectional view of the male connector of FIG. 48 with both the first shutter and the second shutter in an open position, exposing the optical fibers of the male connector for mating;

FIG. 56 is a top view of another embodiment of a second connection component in the form of an adapter, the adapter provided in the form of a quad-layered fiber connection component;

FIG. 57 is a side view of the adapter of FIG. 56;

FIG. 58 is a cross-sectional view of the adapter of FIGS. 56-57, the cross-sectional view taken along line 58-58 of FIG. 56 that bisects the adapter;

FIG. 63 is a top view of the fiber optic connection system utilizing the quad-layered adapter of FIGS. 56-62, with two quad-layered male connectors mated therethrough;

FIG. 64 is a side view of the fiber optic connection system of FIG. 63;

DETAILED DESCRIPTION

Figure 7:
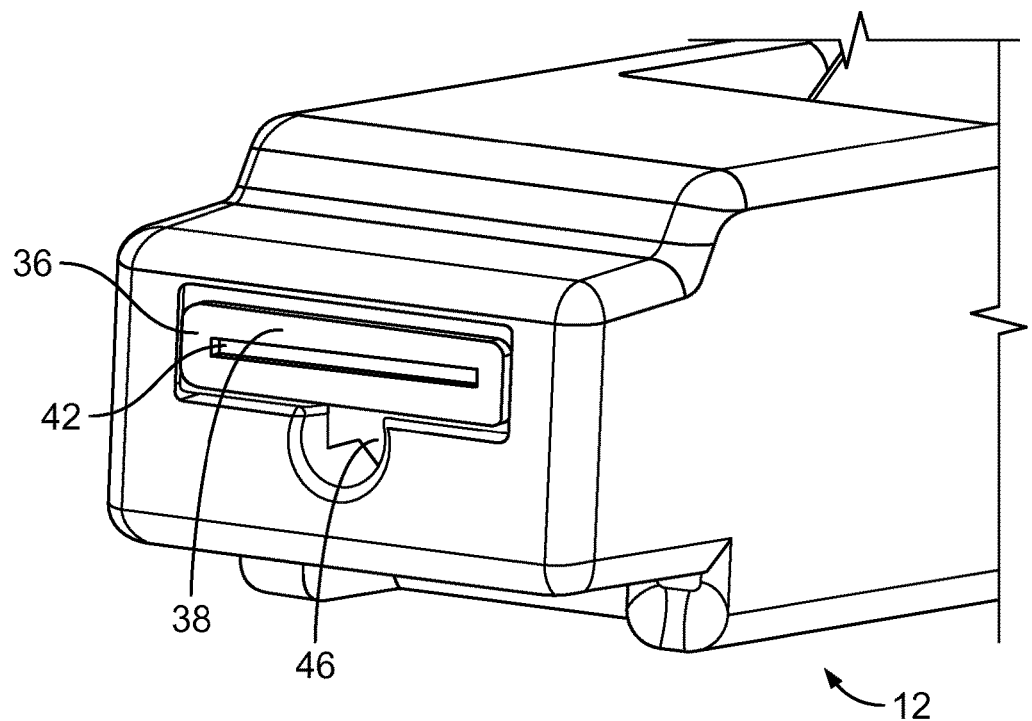
FIG. 7 is a partial perspective view showing the front end of the male connector of FIG. 6.

Referring now to FIGS. 1-15, a first embodiment of a fiber optic connection system 10 is shown. System 10 includes a first fiber optic connection component 12 (e.g., a male fiber optic connector) terminating a first fiber optic cable 14 and a second fiber optic connection component 16 (e.g., a female fiber optic connector) terminating a second fiber optic cable 18. The male and female connectors 12, 16 are configured to intermate for passing the fiber optic signal from the first cable 14 to the second cable 18 without an intermediate fiber optic adapter according to the features of the system 10.

In the depicted embodiments of the disclosure, the fiber optic connection system 10 is configured as a multi-fiber connection system that is configured to align a plurality of optical fibers 20 carried by each cable.

In the depicted embodiments of the disclosure, the multiple fibers 20 are generally aligned in a row, similar to that of a ribbonized fiber formation.

Referring specifically to FIGS. 5-8, the first fiber optic connection component in the form of a male fiber optic connector 12 is shown.

The male fiber optic connector 12 includes a shroud 22, a connector inner housing 24, and a connector sliding outer housing 23. As will be discussed in further detail below, the shroud 22 is slidably disposed with respect to the connector inner housing 24. The connector sliding outer housing 23 is also slidably disposed with respect to the opposite end of the connector inner housing 24.

The connector inner housing 24 is formed from a connector inner housing base part 27 that is coupled to a connector inner housing top part 29. The connector inner housing top part 29 is slidably coupled to the connector inner housing base part 27 as seen in FIG. 5F.

Figure 8:
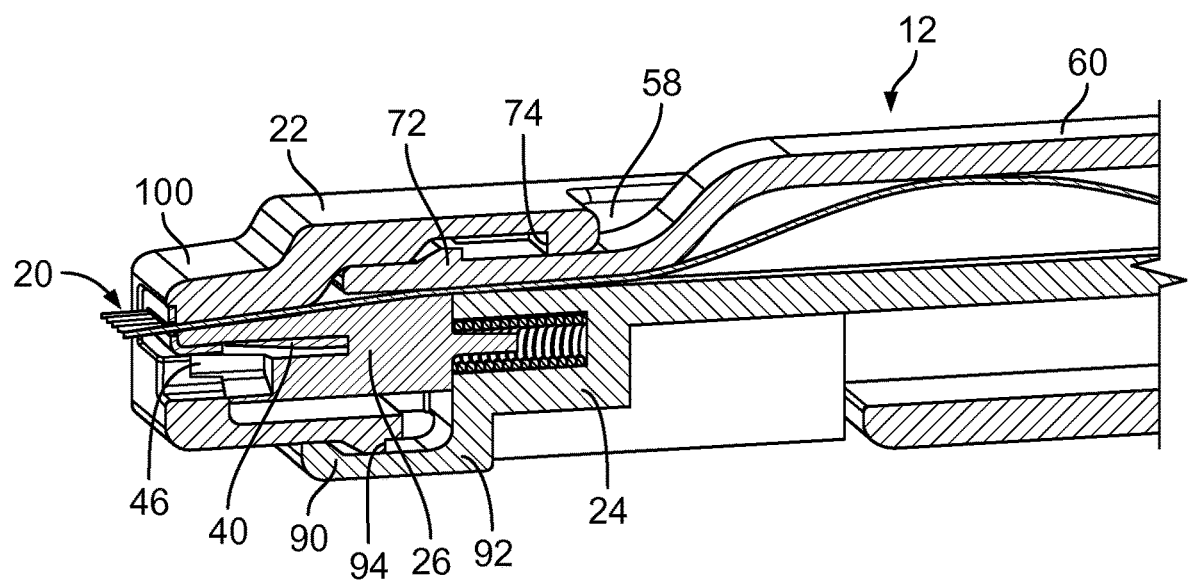
FIG. 8 illustrates the cross-sectional view of the male connector of FIG. 6 with both the first shutter and the second shutter in an open position, exposing the optical fibers of the male connector for mating.

As shown in the cross-sectional views in FIGS. 6 and 8 that bisect the male connector 12, and as will be explained in further detail below, the shroud 22 is configured to slide rearward with respect to the connector inner housing 24 to expose the optical fibers 20 of the first cable 14 for alignment with the fibers 20 of the second cable 18 that has been terminated by the female connector 16.

The shroud 22 is formed from a shroud outer housing 25 and a shroud inner housing 26 that is generally wedged at a front end 28 of the shroud outer housing 25. The shroud inner housing 26 is axially fixed with respect to the shroud outer housing 25. The shroud inner housing 26 cooperates with an upper wall 30 of the shroud outer housing 25 when guiding fibers 20 out of the shroud 22 for alignment with the fibers 20 of the female connector 16. The fibers 20 are positioned between an upper surface 32 of the shroud inner housing 26 and an interior surface 34 of the upper wall 30 of the shroud outer housing 25 as shown in FIGS. 6 and 8. The upper surface 32 of the shroud inner housing 26 is provided at an angle for guiding the fibers 20 out of the male connector 12 at a generally downward angle.

At the front end 28 of the shroud outer housing 25 of the male connector 12 is positioned a first shutter 36. The shutter 36 defines a vertical portion 38 and a horizontal portion 40. The vertical portion 38 is generally movable in the up and down direction perpendicular to the axial direction. The vertical portion 38 of the shutter 36 defines a window 42 that exposes the fibers 20 and allows the fibers 20 to protrude out therefrom when the shutter 36 has been moved upwardly. As shown in FIGS. 1, 2, 6, and 8, the horizontal portion 40 defines an elongate configuration and is generally housed within a pocket 44 of the shroud inner housing 26. The horizontal portion 40 of the shutter 36 that is within the pocket 44 of the shroud inner housing 26 biases the vertical portion 38 downwardly to keep the shutter 36 in a closed position (i.e., the shutter window 42 in an un-aligned position with respect to the fibers 20) when the male connector 12 is not being mated to the female connector 16.

A keyhole 46 is positioned below the shutter 36 for receiving a shutter key or pin 48 in moving the vertical portion 38 of the shutter 36 upwardly when the male connector 12 is mated to the female connector 16 as will be described in further detail below.

In mating the male connector 12 to the female connector 16, the connector sliding outer housing 23 defines locking features 50 on right and left sidewalls 52 thereof for locking with the female connector 16. The locking features 50 define ramps 54 that contact and laterally move cantilever arms 56 located on the female connector 16 when slidably disconnecting the male connector 12 from the female connector 16. Since the male connector 12 provides a "slidable outer housing over an inner housing" design, the connector sliding outer housing 23 can be moved with respect to both the connector inner housing 24 and the female connector 16 in freeing the latched connector inner housing 24 of the male connector 12 from the cantilever arms 56 of the female connector 16. The connection and disconnection of the male connector 12 to and from the female connector 16 are similar to that used for SC connectors and adapters known in the art.

Generally, the ramps 54 defined by the connector sliding outer housing 23 laterally move the cantilever arms 56 of the female connector 16 and free the cantilever arms 56 from the connector inner housing 24 when the connector sliding outer housing 23 is pulled back with respect to the connector inner housing 24 and the female connector 16. A similar "slidable outer housing over an inner housing" locking and unlocking motion is used for SC connectors when latching and unlatching SC connectors to and from SC format adapters.

Still referring to FIGS. 5-8, the shroud outer housing 25 and the connector sliding outer housing 23 cooperatively define a window 58 for accommodating a protruding portion 60 of the connector inner housing 24. The protruding portion 60 is defined as part of the connector inner housing top part 29. As will be discussed in further detail below, the protruding portion 60 of the connector inner housing 24 defines a buckling region 62 for the fibers 20 that are housed by the male connector 12 and accommodate any macrobending of the fibers 20 when the male and female connectors 12, 16 are physically brought together.

Still referring to FIGS. 5-8, the fibers 20 of the first cable 14 are fixedly mounted to the connector inner housing base part 27 of the male connector 12. The connector inner housing base part 27 defines a potting area 64 for fiber fixation generally toward the back 66 thereof, behind the fiber buckling region 62.

The connector inner housing 24 is generally biased rearward with respect to the shroud 22 via a shroud spring 68 extending between the shroud inner housing 26 and a spring pocket 70 defined in connector inner housing base part 27. It can also be said that the shroud 22 is biased forward via the spring 68 relative to the connector inner housing 24 of the male connector 12.

As shown in FIGS. 1, 2, and 5-8, an upper tab 72 of the connector inner housing 24 contacting a stop surface 74 defined on the shroud outer housing 25 keeps the shroud 22 slidably mounted with respect to the connector inner housing 24 and prevents the shroud 22 from falling off.

When moving in the forward direction, the connector inner housing 24 is prevented from axially exiting the shroud 22 by a number of structures. For example, the protruding portion 60 of the connector inner housing 24 extending through the window 58 of the shroud 22 prevents the connector inner housing 24 from exiting the shroud 22 when moving in the forward direction. Also, when moving in the forward direction, a front end 76 defined by an upper wall 78 of the connector inner housing 24 abuts the end 80 of a pocket 82 defined by the upper wall 30 of the shroud outer housing 25 to stop the forward movement of the connector inner housing 24.

For the connector sliding outer housing 23, a lower tab 84 of the connector sliding outer housing 23 also contacts a stop surface 86 defined by a rear wall 88 of the connector inner housing 24 to prevent the connector sliding outer housing 23 from sliding off in the rearward direction with respect to the connector inner housing 24.

Still referring to FIGS. 5-8, it should be noted that, in order to expose the fibers from the front end 28 of the shroud outer housing 25, the entire shroud 22 (including the shroud inner housing 26) has to be slidably moved rearward relative to the connector inner housing 24 (or the connector inner housing 24 moved forward relative to the shroud 22). However, as shown in FIGS. 5B and 5D-5F, the connector inner housing base part 27 defines a tab 91 at a front end of a bottom wall 92 thereof that interfaces and cooperates with a catch 96 defined by a lower wall 94 of the shroud outer housing 25 to define a shroud lock 90, which is configured to prevent an operator to push the shroud 22 toward the connector inner housing 24 and provide protection for the bare fiber tip.

The catch 96 has to be freed from the locking tab 91 in order to allow the shroud 22 to be moved rearwardly with respect to the connector inner housing 24. In FIG. 8, the male connector 12 is shown with the catch 96 having cleared the front tab 91 of the connector inner housing base part 27 and the shroud 22 having been moved rearwardly with respect to the connector inner housing 24, allowing the fibers 20 to protrude out from the front of the male connector 12. As will be described in further detail below, the female connector 16 has a pair of deflection features 98 that contact lifting arms 99 defined at the sides of the middle tab 91 of the connector inner housing base part 27 and lift the lifting arms 99. Raising of the lifting arms 99 provides a lift of a portion of the bottom wall 94 of the shroud outer housing 25 that includes the catch 96 and frees the catch 96 from the front tab 91 of the connector inner housing base part 27 to allow movement of the shroud 22. Please refer to FIGS. 5D-5F.

When the shroud 22 has been moved rearward with respect to the connector inner housing 24 and the fibers 20 are protruding out of the male connector 12, the spring 68 is in a compressed state. The spring 68 is configured to push the shroud 22 forwardly in the axial direction relative to the connector inner housing 24 when the male connector 12 is removed from the female connector 16. In doing so, the catch 96 defined by the bottom wall 94 of the shroud outer housing 25 once again moves over tab 91 of the connector inner housing base part 27 and becomes locked thereto to prevent rearward movement of the shroud 22. As shown, when the spring 68 is reextending and the shroud 22 is being moved forward with respect to the connector inner housing 24, the upper tab 72 of the connector inner housing 24 once again contacts the stop surface 74 defined on the shroud outer housing 25 and prevents the shroud 22 from falling off.

The fibers 20 are retracted into the male connector 12 when the shroud 22 is at its forwardmost position relative to the connector inner housing 24.

It should be noted that, in addition to the shutter 36 of the male connector 12 that moves perpendicular to the axial direction, the shroud 22 can also be said to define a second shutter 100 that moves in the axial direction. The shroud 22 acts as a second, axial shutter 100 when slidably moving back and forth with respect to the connector inner housing 24 of the male connector 12. The shroud 22 has to be unlatched, as discussed above, in order to be moved rearwardly with respect to the connector inner housing 24 to expose the optical fibers 20 for connection.

The buckling region 62 accommodates any macrobending of the fibers 20 as the fibers 20 protrude out of the male connector 12 and contact the fibers 20 of the female connector 16, as will be described in further detail below. According to the depicted embodiment of FIGS. 1-8, the buckling region 62 defines separate channels 102 for directionally controlling the buckling of the fibers 20 as they macrobend.

Figure 9:
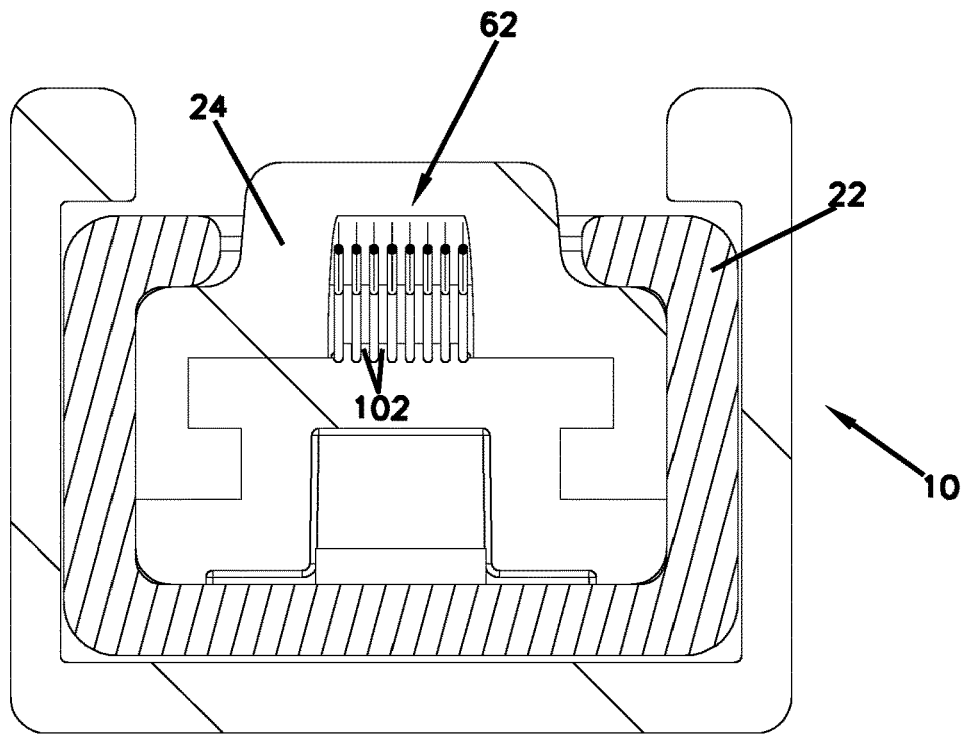
FIG. 9 is a cross-sectional view taken along a line similar to line 4-4 of FIG. 3, illustrating a buckling region of the male connector that is configured to accommodate eight optical fibers.
Figure 11:
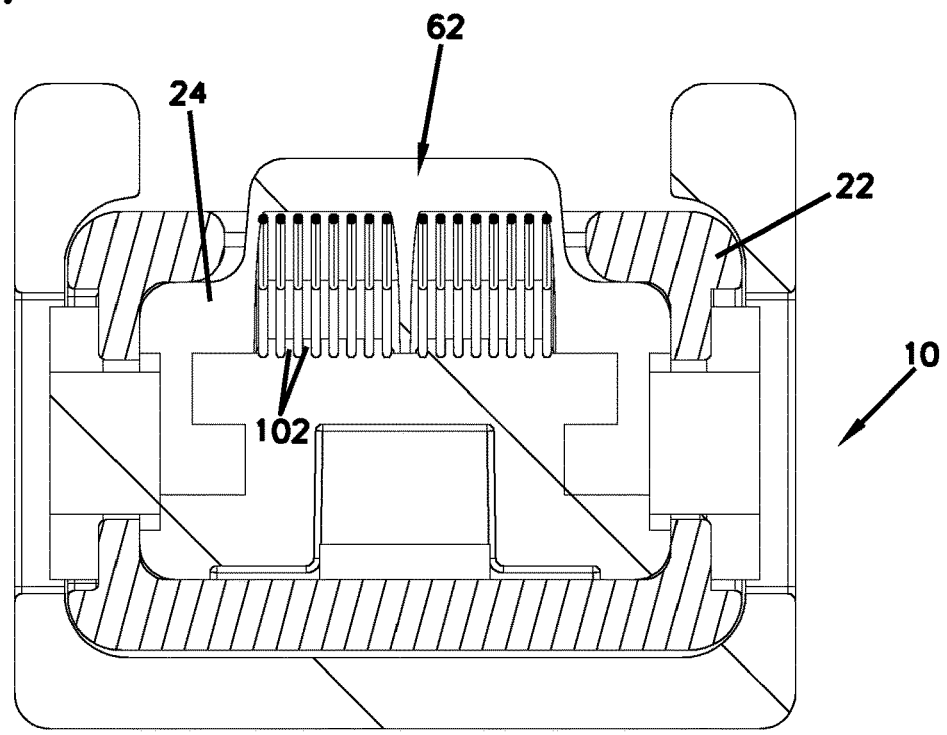
FIG. 11 is a cross-sectional view taken along a line similar to line 4-4 of FIG. 3, illustrating another example of a buckling region of the male connector that is formed from two separate cavities, each configured to accommodate eight optical fibers.
Figure 10:
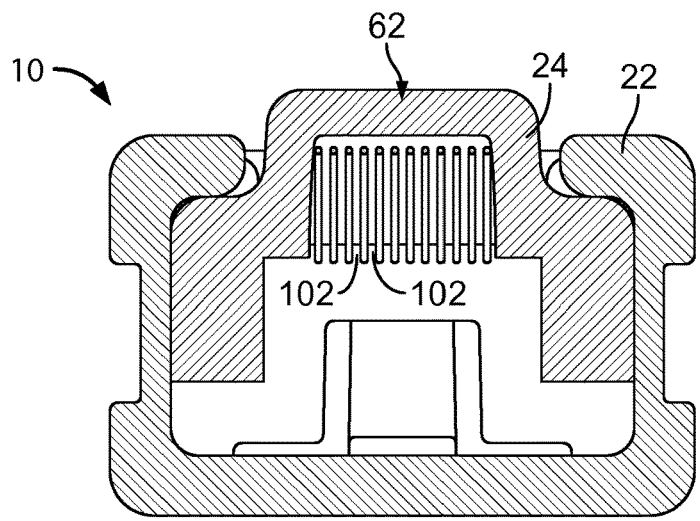
FIG. 10 is a cross-sectional view taken along a line similar to line 4-4 of FIG. 3, illustrating another example of a buckling region of the male connector that is configured to accommodate twelve optical fibers.
Figure 12:
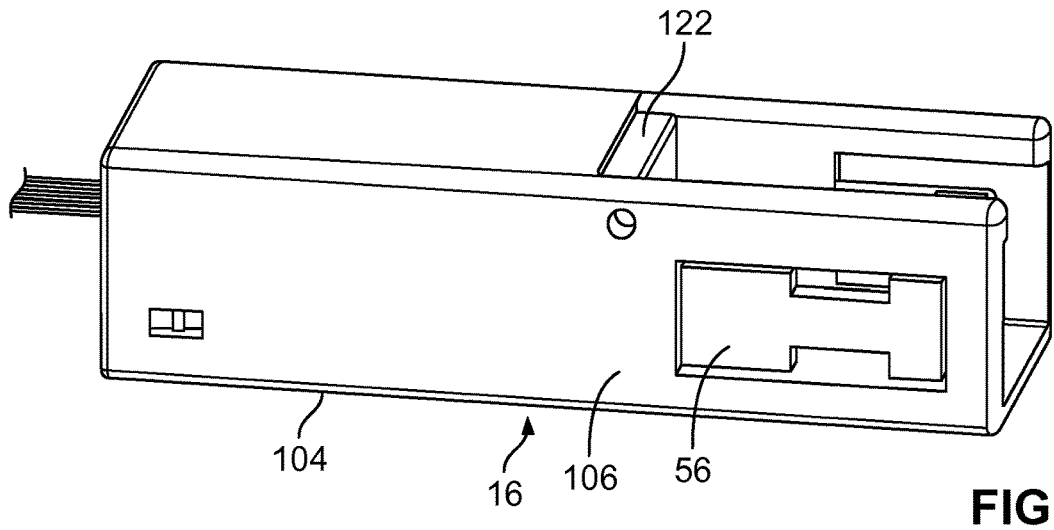
FIG. 12 is a perspective view of the female connector of the fiber optic connection system of FIGS. 1-3.
Figure 13:
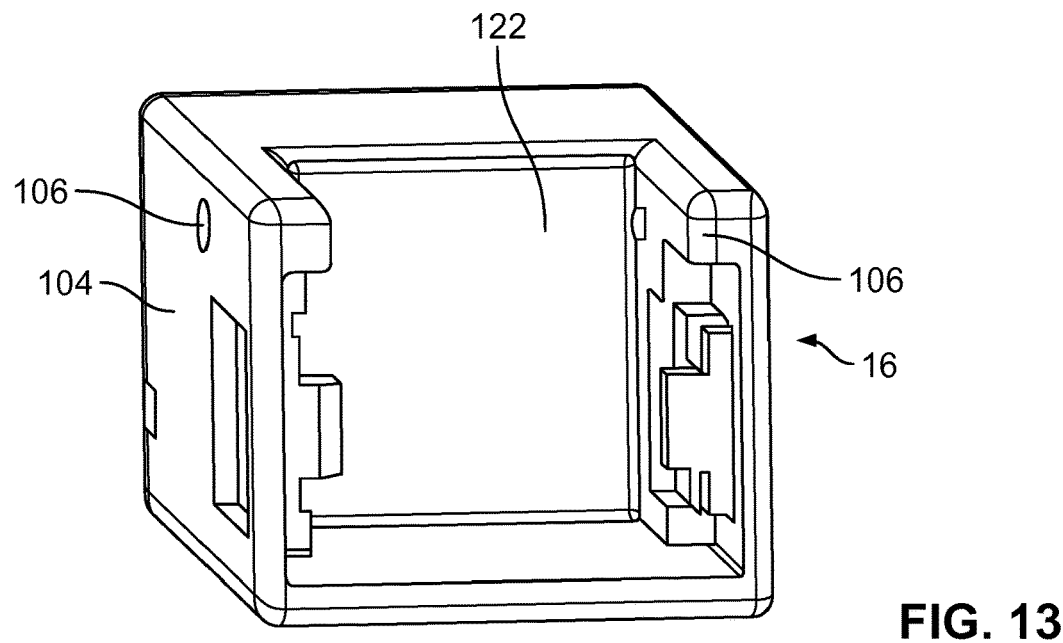
FIG. 13 is a partial perspective view illustrating the front end of the female connector of FIG. 12.
Figure 14:
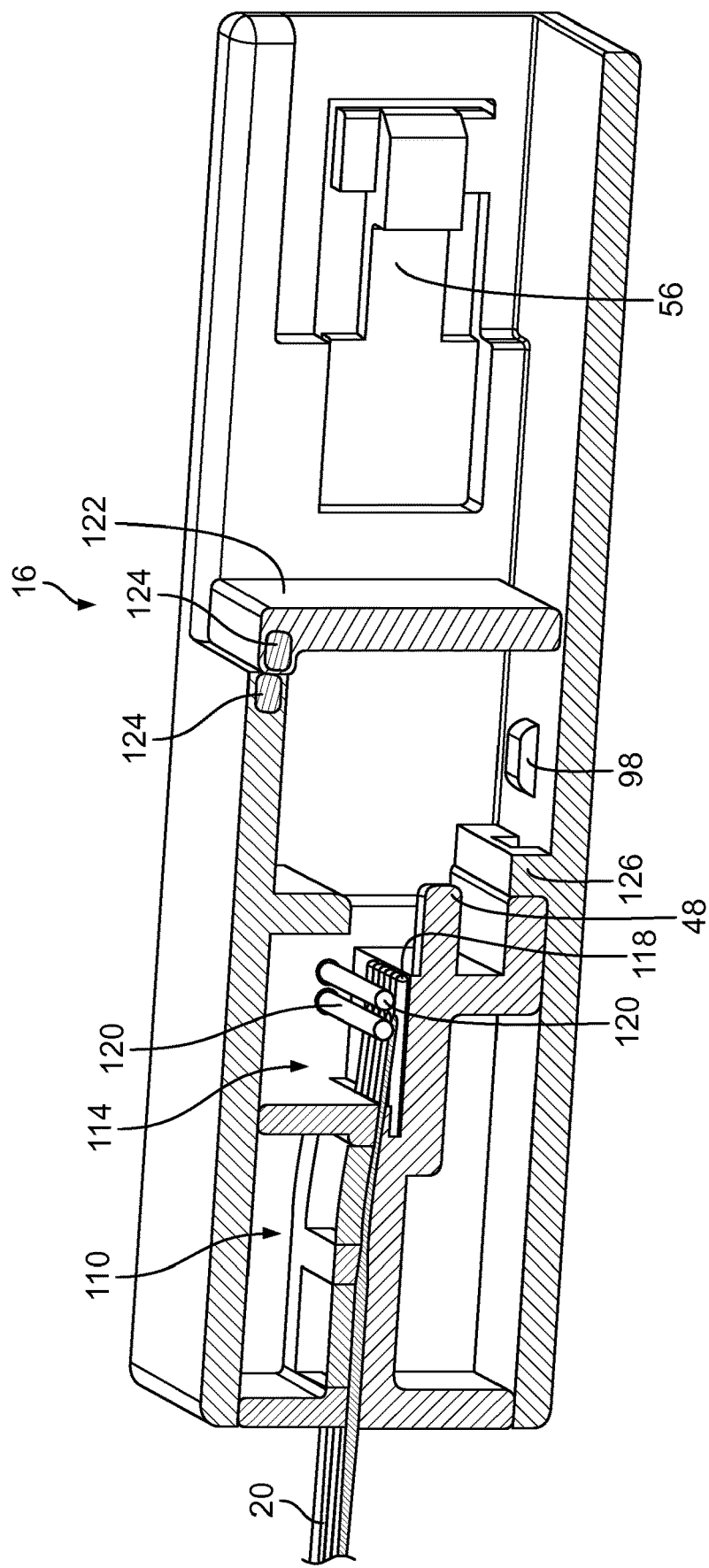
FIG. 14 is a perspective cross-sectional view of the female connector of FIGS. 12-13, the cross-sectional view taken along a line bisecting the female connector, the female connector shown with the pivoting shutter in a closed position.

As shown in FIGS. 9-11, the buckling region 62 can be configured to define a varying number of channels 102 depending upon the number of fibers 20 being terminated by the connector 12. For example, in FIG. 9, a buckling region 62 having eight channels 102 for accommodating eight fibers 20 is shown. In FIG. 10, a buckling region 62 having twelve channels 102 for accommodating twelve fibers 20 is shown. According to other embodiments, the male connector 12 can include two separate buckling regions or cavities 62, each for accommodating, e.g., eight fibers 20, as shown in FIG. 11.

It should be noted that, depending upon the width of the channels 102, multiple fibers 20 may be accommodated within a single buckling channel 102.

According to one example embodiment, the buckling region 62 may accommodate macrobending up to 18 mm of deflection.

Now referring to FIGS. 12-15, the second fiber optic connection component in the form of a female fiber optic connector 16 of the fiber optic connection system 10 is shown. As discussed previously, the female connector 16 defines a housing 104 that is configured to receive the male connector 12, including the shroud 22, the connector inner housing 24, and the connector sliding outer housing 23.

The cantilever arms 56 are defined on sidewalls 106 of the housing 104 of the female connector 16. As noted above, the cantilever arms 56 are configured to latch onto the sidewalls of the connector inner housing 24 of the male connector 12. The connector sliding outer housing 23 of the male connector 12 can be moved with respect to both the connector inner housing 24 and the female connector 16 in freeing the cantilever arms 56 from the connector inner housing 24 of the male connector 12 similar to that used in unlatching SC connectors from SC adapters as known in the art.

Within the interior 108 of the housing 104 of the female connector 16, a fiber fixation portion 110 is provided at a rear end 112 thereof. The fibers 20 of the second cable 18 are terminated to the female connector 16 via potting.

In front of the fiber fixation portion 110 is provided the fiber alignment portion 114. The fibers 20 transition from the fiber fixation portion 110 to the fiber alignment portion 114 at a generally downward angle. The fiber alignment portion 114 includes a fiber alignment structure 116 defining a plurality of v-grooves or channels 118 for receiving both the fibers 20 coming from the fixation portion 110 of the female connector 16 and the protruding fibers 20 coming from the male connector 12.

According to certain examples, the v-grooves 118 of the fiber alignment structure 116 may be formed by grinding a metal structure or a plastic molded structure to define channels having a 0.25 mm pitch.

A pair of rods 120 having a cylindrical cross-section extend transversely over the v-grooves 118. The rods 120 are configured to guide fibers 20 coming from both directions downwardly onto the v-grooves 118 for alignment. The combination of the v-grooves 118 and the rods 120 provide a cone-like configuration for guiding each of the plurality of fibers 20 into alignment.

Figure 15A:
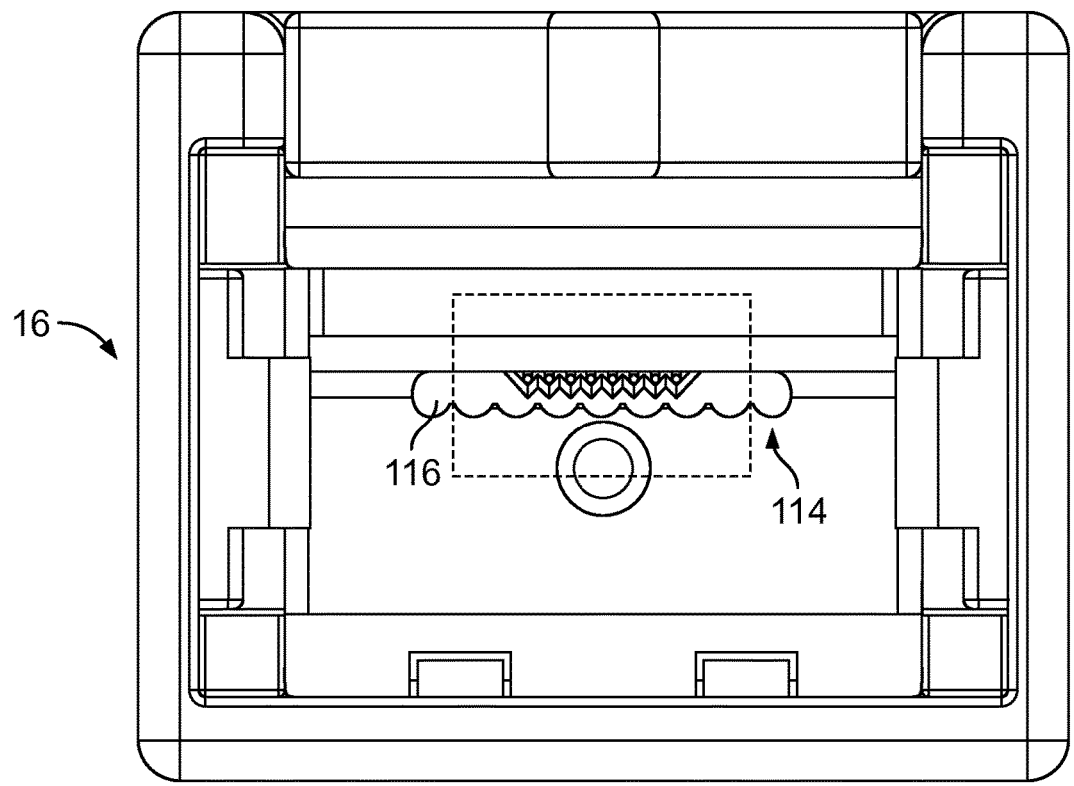
FIG. 15A is a front end of the female connector of FIGS. 12-14 with the pivoting shutter in an open position for illustrating the fiber alignment portion of the female connector.
Figure 15B:
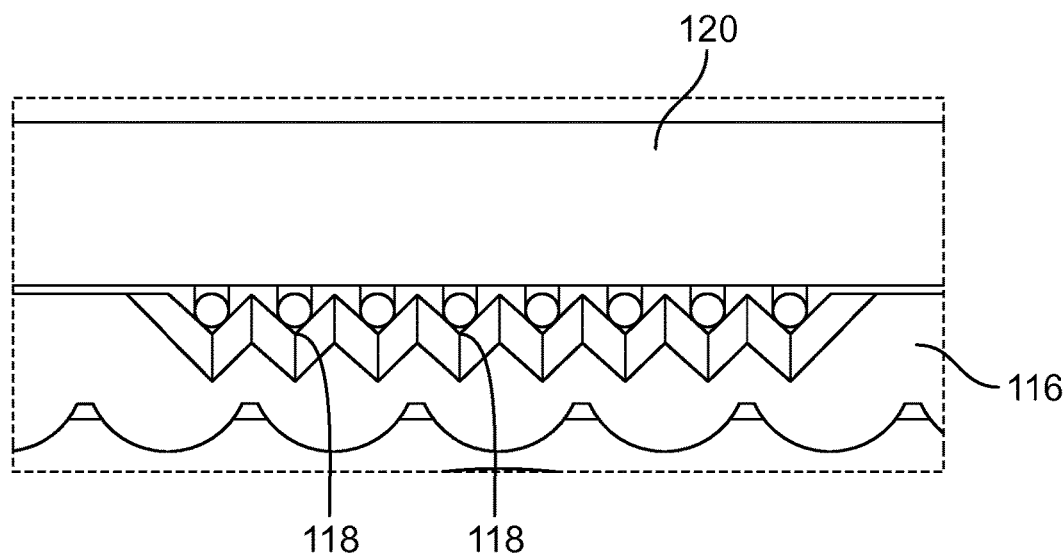
FIG. 15B is a close-up view of the fiber alignment structure located at the fiber alignment portion of the female connector of FIG. 15A.
Figure 15C:
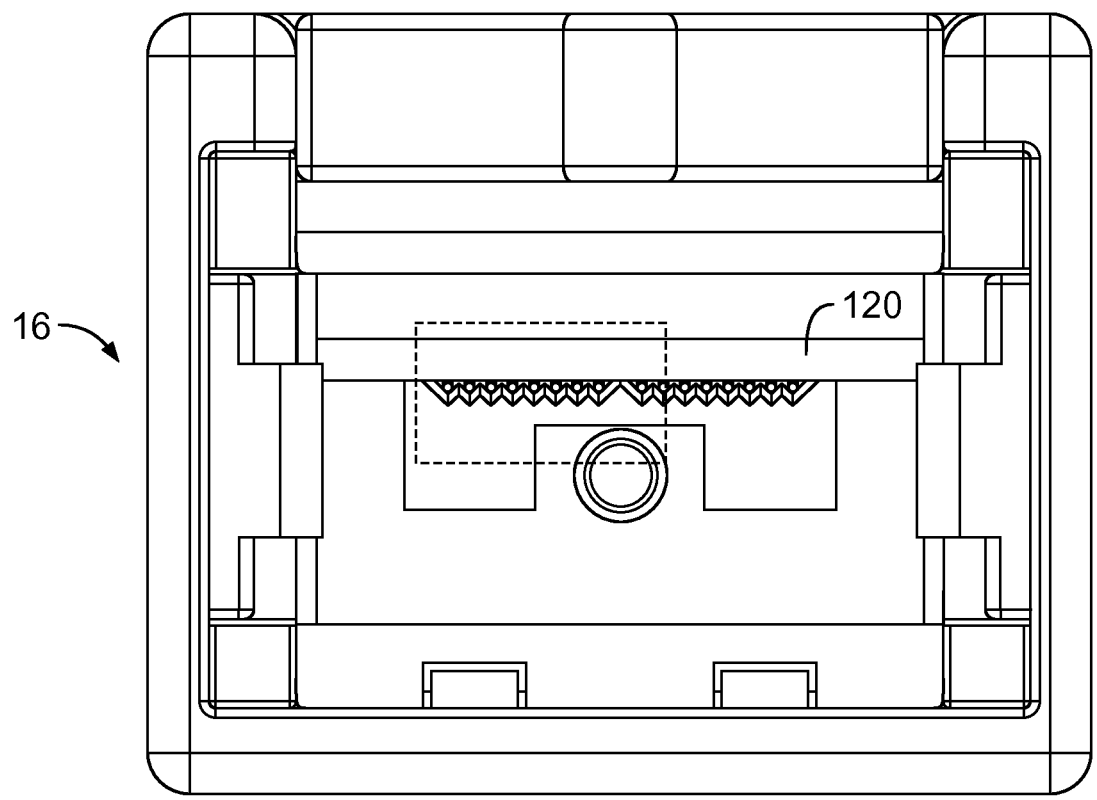
FIG. 15C illustrates another version of a fiber alignment structure that can be used within the female connector of FIGS. 12-14.
Figure 15D:
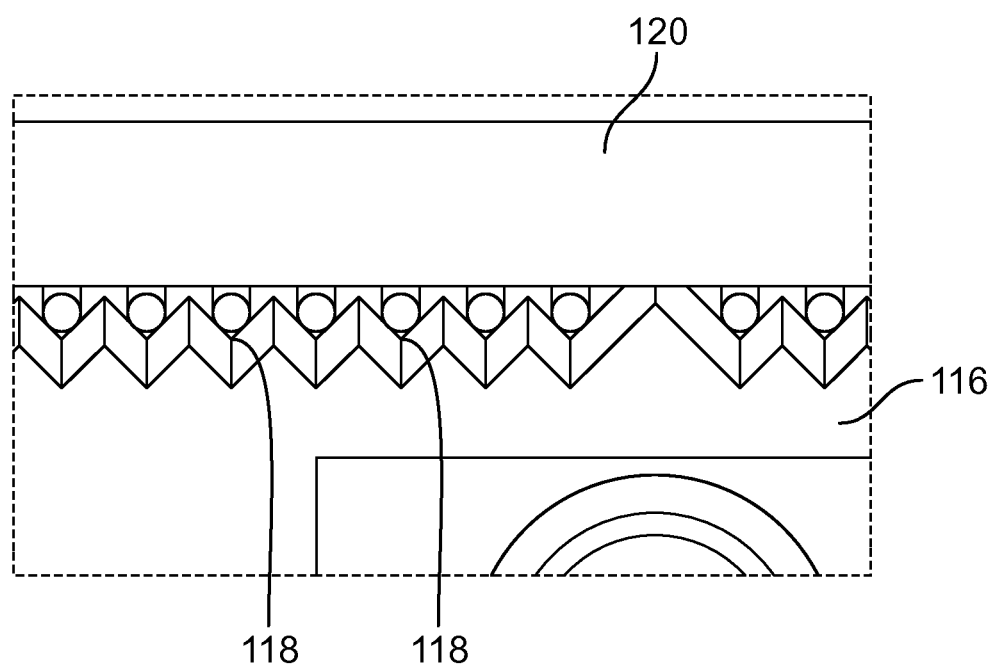
FIG. 15D is a close-up view of the fiber alignment structure located at the fiber alignment portion of the female connector of FIG. 15C.
Figure 16:
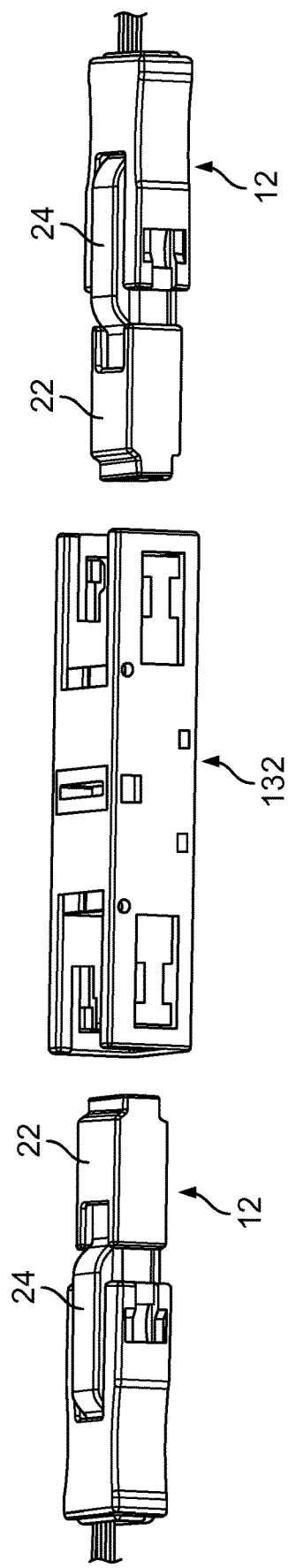
FIG. 16 illustrates another example of a second connection component of the fiber optic connection system in the form of an adapter, the adapter configured to physically and optically mate two of the male connectors of FIGS. 5-8.
Figure 17:
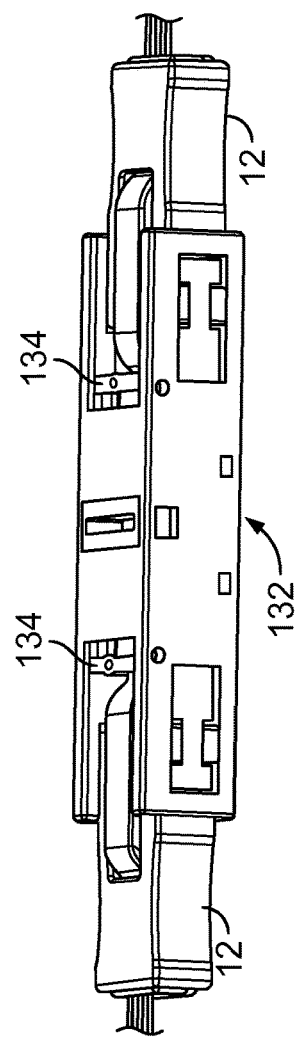
FIG. 17 illustrates the adapter of FIG. 16 with two male connectors mated thereto.
Figure 18:
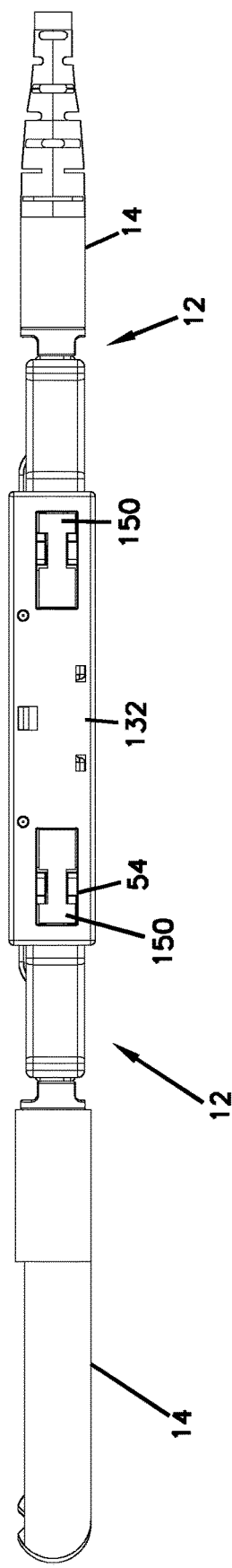
FIG. 18 is a side view of the fiber optic connection system of FIG. 17.
Figure 20:
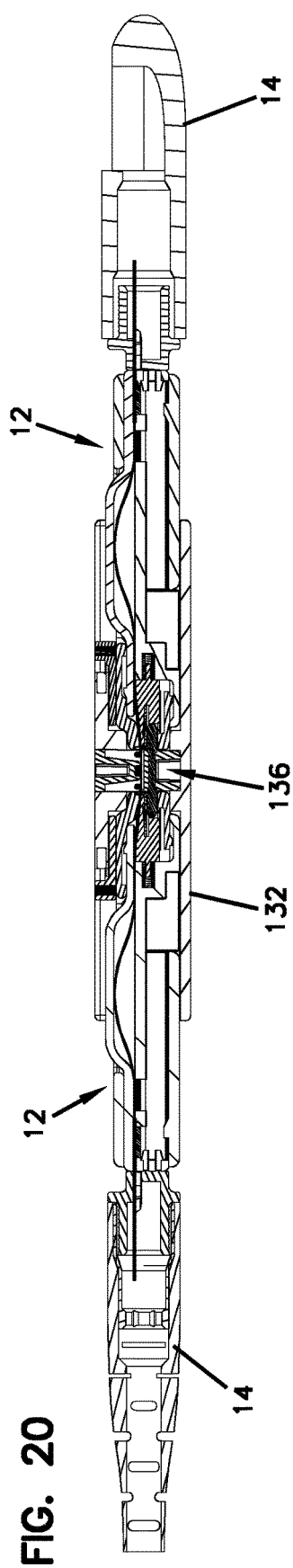
FIG. 20 illustrates another cross-sectional view of the fiber optic connection system of FIG. 19.
Figure 19:
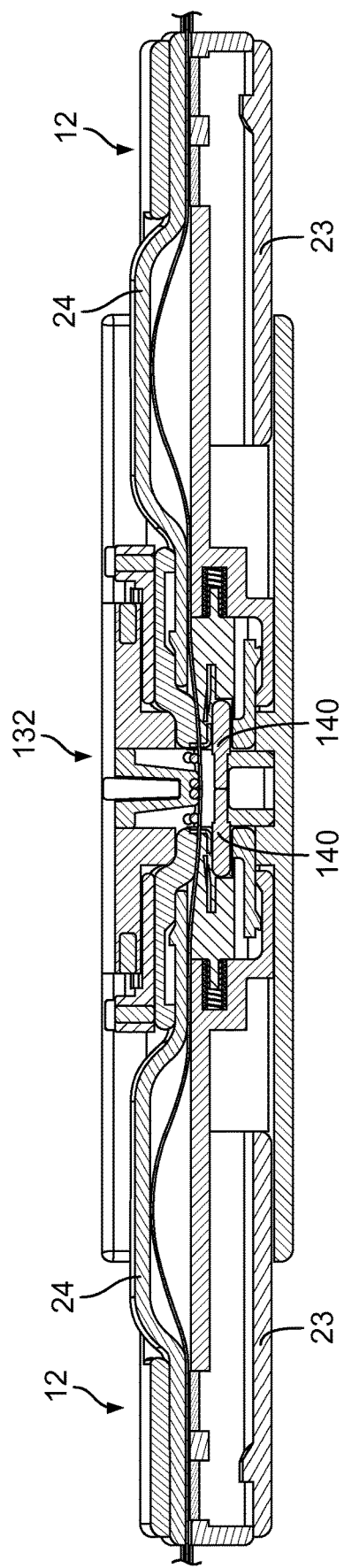
FIG. 19 illustrates a cross-sectional view of the adapter and the two mated male connectors of FIGS. 17-18, the cross-sectional view taken along a line bisecting the adapter and the male connectors.
Figure 23:
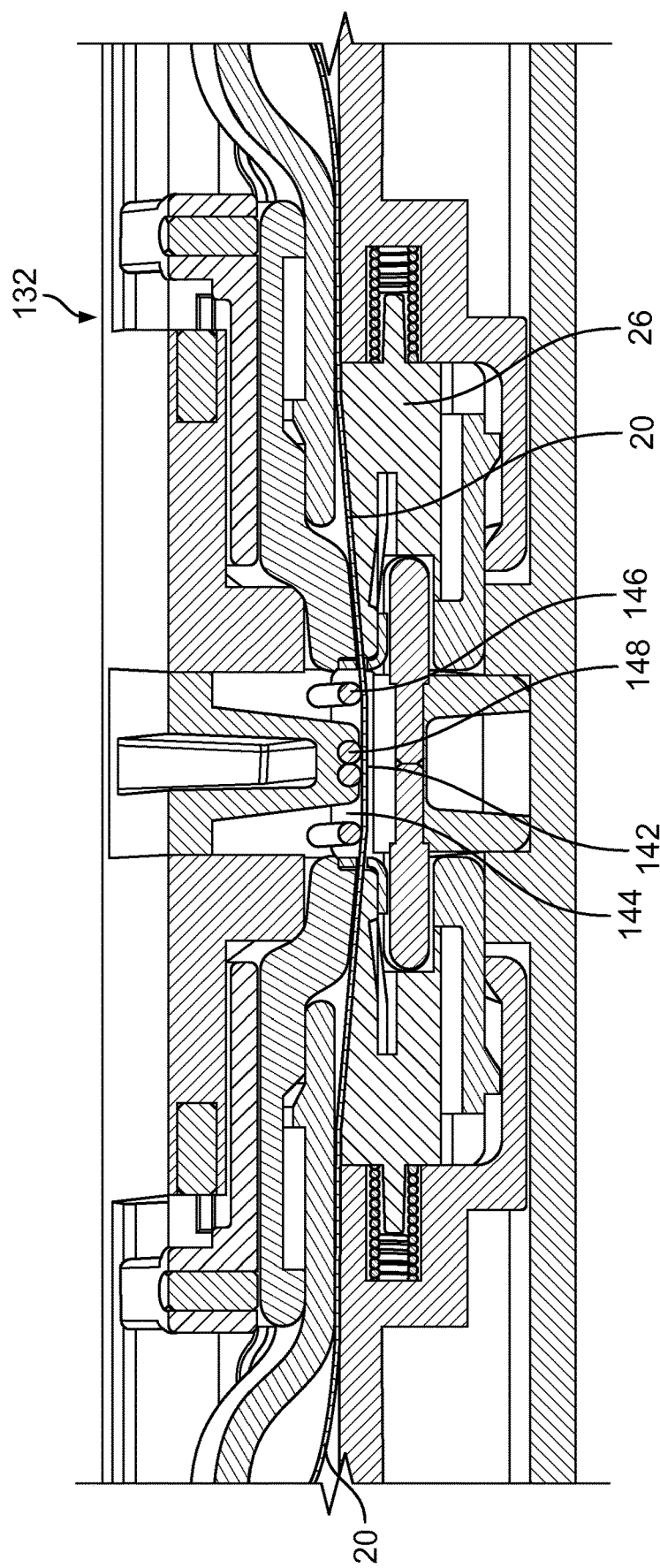
FIG. 23 is a close-up view of the fiber alignment portion of the adapter of FIG. 22.
Figure 26:
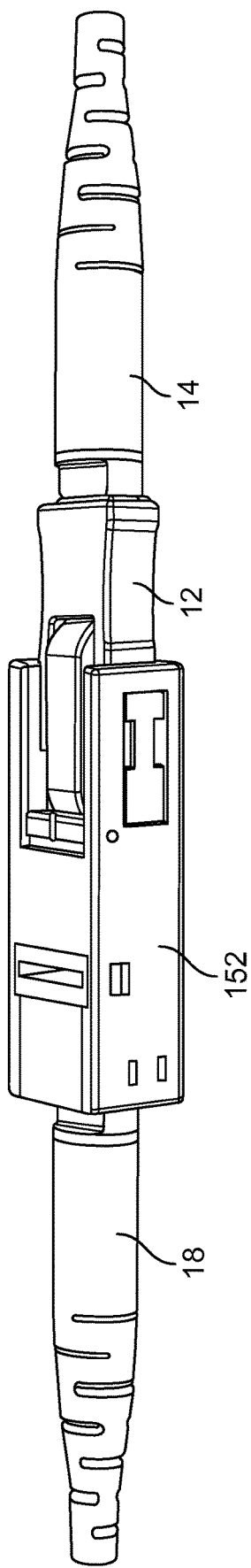
FIG. 26 illustrates the male and female connectors of FIG. 25 in a mated configuration.
Figure 27:
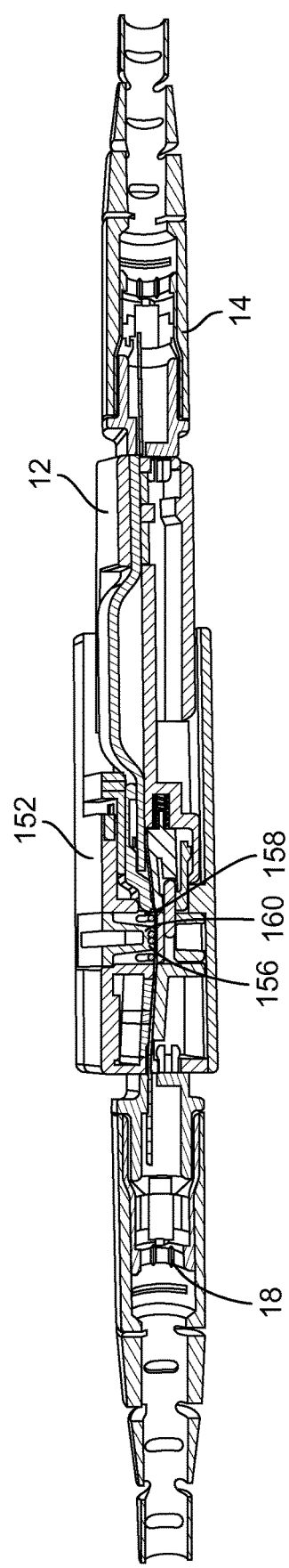
FIG. 27 is a cross-sectional view of the male and female connectors of FIG. 26, the cross-sectional view taken along a line bisecting the male and female connectors.

Similar to that discussed above with respect to the buckling region 62 of the male connector 12, the v-grooves 118 of the fiber alignment region 114 of the female connector 16 can vary in number depending upon the number of fibers 20 being terminated by the connector 16. A fiber alignment structure 116 defining eight v-grooves or channels 118 is shown in FIGS. 15A and 15B. As shown in FIGS. 15C and 15D, the fiber alignment region 114 can include a pair of separate fiber alignment structures 116, each defining a plurality of v-grooves 118 (e.g., eight v-grooves or channels). A female connector 16 such as the one shown in FIGS. 15C and 15D would be able to mate with a male connector 12 such as that shown in FIG. 11 that includes two separate buckling cavities 62.

In insertion, as the male connector 12 enters the housing 104 of the female connector 16, a third shutter 122 of the female connector 16 is pivotally moved out of the way. The pivoting third shutter 122 is positioned generally midway along the length of the female connector housing 104 to prevent access (e.g., to provide a tamper-proof design) and provide eye protection. The pivoting shutter 122 uses oppositely oriented poled magnets 124 to bias the shutter 122 closed.

As the male connector 12 is further inserted, the deflection tabs 98 (only one is shown in the cross-sectional views that bisect the female connector 16) contact the lifting arms 99 defined at the sides of the middle tab 91 of the connector inner housing base part 27 and lift the lifting arms 99. Raising of the lifting arms 99 provides a lift of a portion of the bottom wall 94 of the shroud outer housing 25 that includes the catch 96 and frees the catch 96 from the front tab 91 of the connector inner housing base part 27 to allow movement of the shroud 22 (Please refer to FIGS. 5D-5F). As such, the fibers 20 can protrude out from the front of the male connector 12.

The structure that forces the shroud 22 of the male connector 12 to move rearwardly is an abutment surface 126 defined by the female connector 16, the abutment surface 126 defined at a location behind the deflection tabs 98.

As discussed above, the final step in mating the male connector 12 to the female connector 16 involves moving the vertical portion 38 of the shutter 36 of the male connector 12 upwardly to align the window 42 of the shutter 36 with the fibers 20 of the male connector 12 for allowing the fibers 20 to protrude therefrom. The female connector 16 includes the shutter key 48 that enters the keyhole 46 positioned below the shutter 36. The key 48 defines a convex front end 128 for contacting and moving the shutter 36 upwardly in aligning the window 42 with the fibers 20.

Once the abutment surface 126 contacts the shroud 22 of the male connector 12 and starts moving the shroud 22 rearward, the fibers 20 protrude out from the male connector 12 and are guided into the v-grooves 118 by the rods 120. The angling of the fibers 20 facilitates the alignment and ensures that the fibers are brought toward the bottom of the v-grooves or channels 118. The circular cross section of the rods 120 also biases the fibers 20 downwardly toward the v-grooves 118.

The male and female connectors 12, 16 are configured such that the cantilever arms 56 of the housing 104 of the female connector 16 lock onto the connector inner housing 24 of the male connector 12 as the fibers 20 abut each other within the v-grooves 118. As noted above, any macrobend or deflection of the fibers 20 due to abutment is accommodated by the buckling region 62 of the connector inner housing 24 of the male connector 12.

When the male and female connectors 12, 16 need to be separated, the male connector 12 is grasped by its connector sliding outer housing 23 and pulled away from the female connector 16. As such, the outer housing 23 starts sliding with respect to the connector inner housing 24 of the male connector 12. The ramps 54 defined by the locking features 50 on the right and left sidewalls 52 of the connector sliding outer housing 23 of the male connector 12 contact and laterally move the cantilever arms 56 located on the female connector 16 to free the latched connection between the female and male connectors 16, 12.

Sliding the male connector 12 out of the housing 104 of the female connector 16 allows all of the biased features of the male connector 12 to return to a neutral position. This includes a forward movement of the shroud 22 with respect to the connector inner housing 24 by the spring 68. A ramped configuration of the catch 96 at the bottom of the shroud outer housing 25 allows the catch 96 to slide over a ramped inner surface 130 of the tab 91 of the connector inner housing base part 27 as the shroud 22 is moved forwardly with respect to the connector inner housing 24. As the shroud 22 is moved forwardly with respect to the connector inner housing 24 (i.e., the connector inner housing 24 is moved rearward relative to the shroud 22), the fibers 20 retract into the male connector 12. The vertical portion 38 of the shutter 36, which is biased downwardly by its horizontal portion 40, moves or pivots to un-align the window 42 relative to the fibers 20 and block the fiber optic signal.

As noted above, when the shroud spring 68 is reextending and the shroud 22 is being moved forward with respect to the connector inner housing 24, the upper tab 72 of the connector inner housing 24 once again contacts the stop surface 74 defined on the shroud outer housing 25 and prevents the shroud 22 from falling off.

Referring now to FIGS. 16-23, another example of a second fiber optic connection component that physically mates with the first fiber optic connection component 12 may be an adapter 132 having features that are examples of inventive aspects in accordance with the present disclosure is shown.

The adapter 132 is configured for mating two of the male connectors 12 shown in FIGS. 5-8 of the disclosure. The adapter 132, thus, can be used for mating two male connectors 12 when the male connector 12 is not being mated with a cable terminated by a female connector 16.

The adapter 132, as shown, defines a configuration similar to that formed by two integrated and oppositely facing female connectors 16 of FIGS. 12-15. The adapter 132 includes magnetically pivotable shutters 134 on both ends and a fiber alignment region 136 in the center that is similar to that formed by two oppositely facing, integrated female connectors 16. The adapter 132 further defines a deflection tab 138 similar to that of a female connector 16 for contacting and moving the catches 96 of the connector sliding outer housing 23 of the male connectors 12 on each end of the adapter 132. Shutter keys or pins 140 (similar to those of female connectors 16) are also defined on both ends of the adapter 132.

The fiber alignment region 136 defines a single fiber alignment structure 142 with v-grooves 144 for aligning the fibers 20 protruding from two male connectors 12. As shown, a pair of outer transverse cylindrical rods 146 are provided adjacent the ends of the v-grooves 144 for facilitating insertion of the fibers 20 into the v-grooves 144. A pair of inner transverse cylindrical rods 148 are provided at the center of the fiber alignment structure 142 for keeping the aligned fibers 20 down within the v-grooves 144 of the alignment structure 142. The fibers 20 are brought into the v-grooves 144 at an angle, which allows the alignment of the fibers 20 in the v-grooves 144 without having the need of a spring or another biasing member to push down the fibers 20 into the v-grooves 144.

The adapter 132 defines cantilever arms 150 similar to that of a female connector 16 at both ports for locking the male connectors 12 thereto.

Now referring to FIGS. 24-28, it should be noted that a fiber alignment region similar to that used in the adapter 132 of FIGS. 16-23 can be utilized in a female connector. As shown in FIGS. 24-28, an example of such a female connector 152 terminating a fiber optic cable 18 is shown. The depicted female connector 152 includes a fiber alignment structure 154 with v-grooves 156 for aligning the fibers 20 of the female connector 152 with those of the male connector 12, a pair of outer transverse cylindrical rods 158 that are provided adjacent the ends of the v-grooves 156 for facilitating insertion of fibers 20 into the v-grooves 156, and a pair of inner transverse cylindrical rods 160 provided at the center of the fiber alignment structure 154 for keeping the aligned fibers 20 down within the v-grooves 156 of the alignment structure 154, all similar to the features of the adapter 132.

It should be noted that the outer transverse cylindrical rod 158 positioned at the female connector side can facilitate insertion of the fibers 20 of a cable 18 into the v-grooves 156 in initially terminating the cable 18 to the female connector 152.

As shown in FIGS. 29-34, the fiber optic connection systems of the present disclosure may be configured to fit within conventional footprints provided in the telecommunications industry. For example, as shown, an adapter 162 may utilize a housing 164 that fits within an SC footprint. In such a system, since the male connectors 166 would also have to fit within the ports provided by an SC-sized adapter 162, certain portions of the connectors 166 may have to be modified. For example, in the depicted embodiment, the buckling region 168 defined by a connector inner housing 170 is completely within the side profile of a connector sliding outer housing 173. The connector sliding outer housing 173 does not define a window through the upper wall 174 thereof for accommodating a protruding portion of the connector inner housing 170. The connector inner housing 170 is within the height of the sliding outer housing 173 in an SC-profiled system such as that shown in FIGS. 29-34. Such a configuration may be utilized when stacking more than one layer of fibers 20 as will be described in further detail below. For example, as will be discussed in further detail below, the fiber optic connection systems of the present disclosure may be used to connect dual-layered, quad-layered, or multi-layered systems.

Still referring to FIGS. 29-34, the male connector 166 includes the shroud 172 that is formed from a shroud outer housing 171, a shroud inner housing base 175, and a shroud inner housing top part 177. A shroud spring 179 biases the shroud 172 forwardly. The connector inner housing 170 of the male connector 166 is formed from a connector inner housing base 181, a connector inner housing top part 183, and a connector top part 185.

Figure 31B:
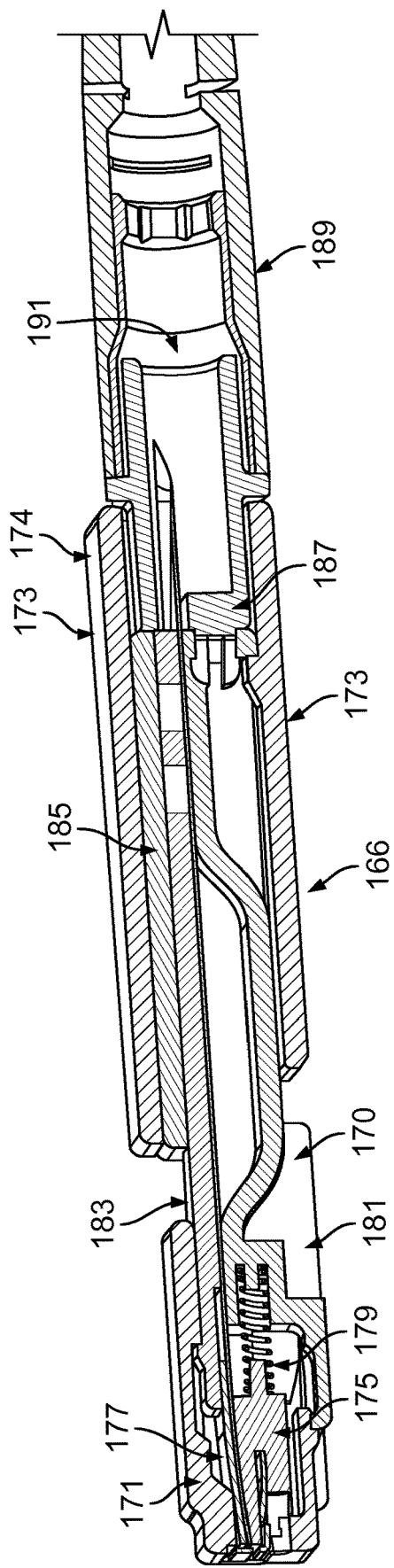
FIG. 31B illustrates a cross-sectional view of one of the male connectors of FIG. 31A, wherein the cross-sectional view is taken along a line that bisects the male connector.
Figure 38:
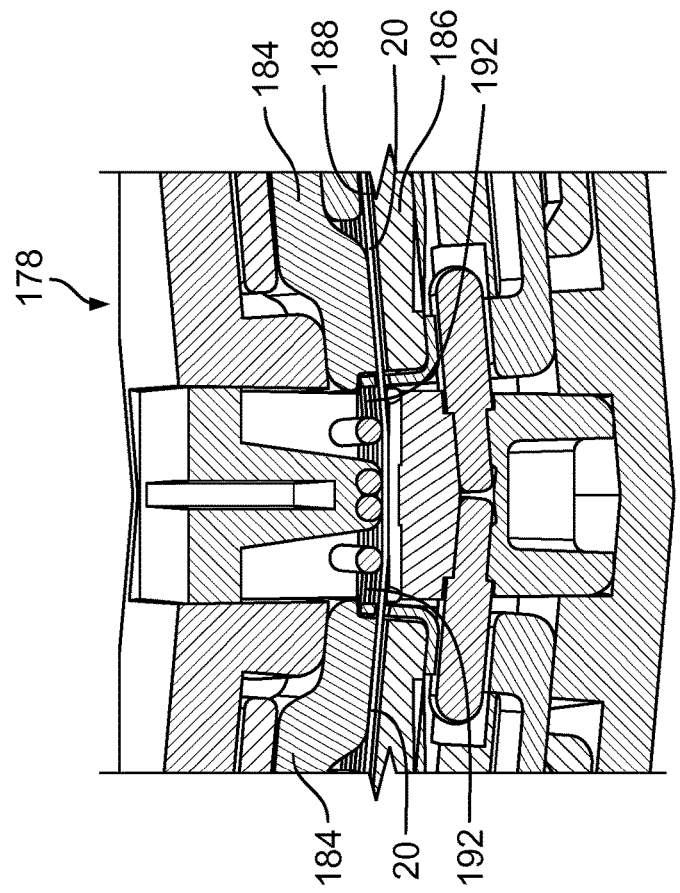
FIG. 38 is a close-up view of the fiber alignment portion of the adapter of FIGS. 35-37.

Now referring specifically to FIG. 31B, the connector sliding outer housing 173 is configured to slide with respect to the connector inner housing 170 similar to previous embodiments for latching/unlatching the male connector 166. A rear body 187 attaches a boot 189 to the connector inner housing 170 of the male connector 166. A crimp ring 191 may be provided adjacent the back end of the rear body 187.

In the male and female connectors described above and illustrated in FIGS. 1-34, both the fibers 20 protruding from the male connector 12/166 and the fibers 20 transitioning from the fiber fixation portion to the fiber alignment portion of the female connectors 16/152 are generally provided at a downward angle to facilitate guiding of the fibers 20 into the v-grooves 118/144/156 of the alignment structures. According to one example, the fibers 20 are generally provided at a 0-10 degree angle to facilitate alignment. According other embodiments, the fibers 20 are brought in at an angle of about 3-8 degrees. According other embodiments, the fibers 20 are brought in at an angle of about 5-8 degrees. According other embodiments, the fibers 20 are brought in at an angle of about 5 degrees. According other embodiments, the fibers 20 are brought in at an angle of about 6 degrees. According other embodiments, the fibers 20 are brought in at an angle of about 7 degrees.

Now referring to FIGS. 35-39, in certain embodiments, the downward angle of the fibers 20 for alignment can be achieved via the housing/body 176 of the adapter 178 or the housing/body 179 of the female connector 180 of the system rather than via structures such as endcaps that have angled surfaces.

In FIGS. 35-39, a system 182 is shown where the male connectors 184 include shroud inner housing bases 186 defining non-angled upper surfaces 188 where the fibers 20 protrude outwardly generally parallel to the longitudinal axes. Such male connectors 184 can be mated via an adapter 178 that defines opposing ports where the ports are provided at an angle (e.g., 5 degrees) along a plane parallel to the sidewalls 190 of the adapter 178. The angling of the ports is configured to replace the angled provision of the fibers 20 from the male connectors and still facilitate guidance of the fibers 20 into the v-grooves 192 of the adapter 178. It should be noted that the adapter 178 includes all of the internal features of the adapter 132 of FIGS. 16-23 except for the angled ports.

Figure 28:
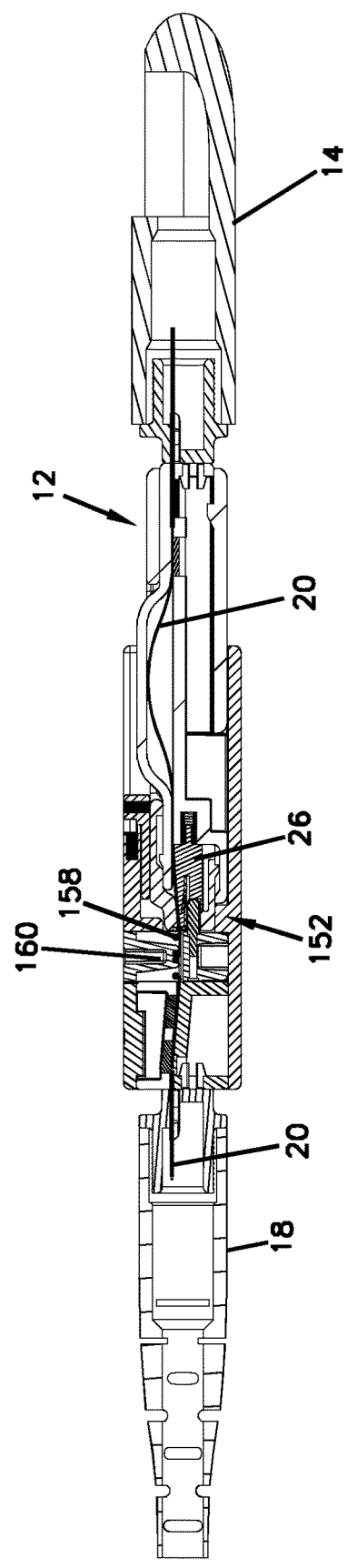
FIG. 28 is another cross-sectional view of the male and female connectors of FIG. 26, the cross-sectional view taken along a line bisecting the male and female connectors.
Figure 39:
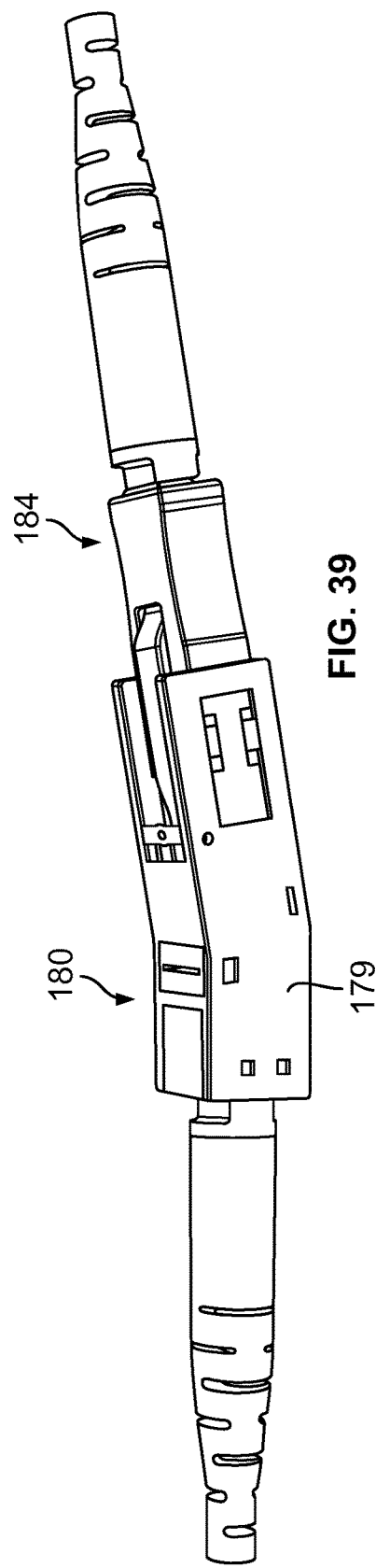
FIG. 39 is a perspective view of another fiber optic connection system including a second connection component in the form of a female connector defining an angled body and one of the male connectors of FIGS. 35-37 mated thereto.
Figure 44:
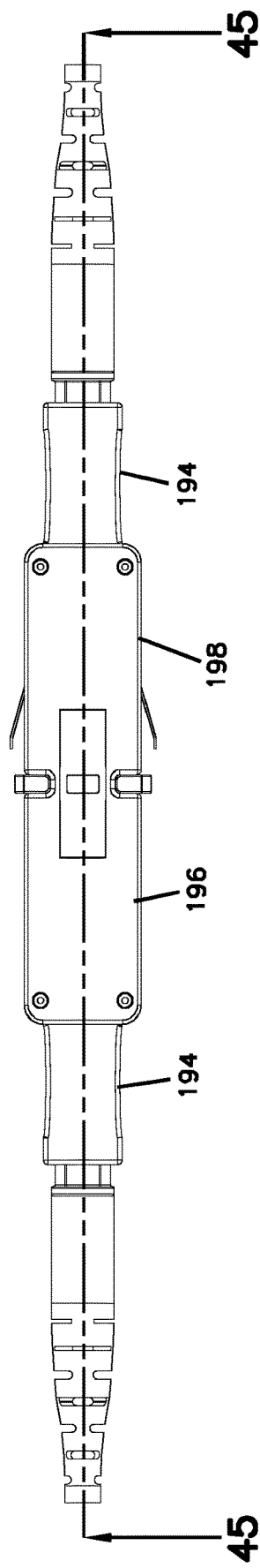
FIG. 44 illustrates a top view of the fiber optic connection system of FIG. 40 with both of the male connectors fully mated through the adapter.
Figure 45:
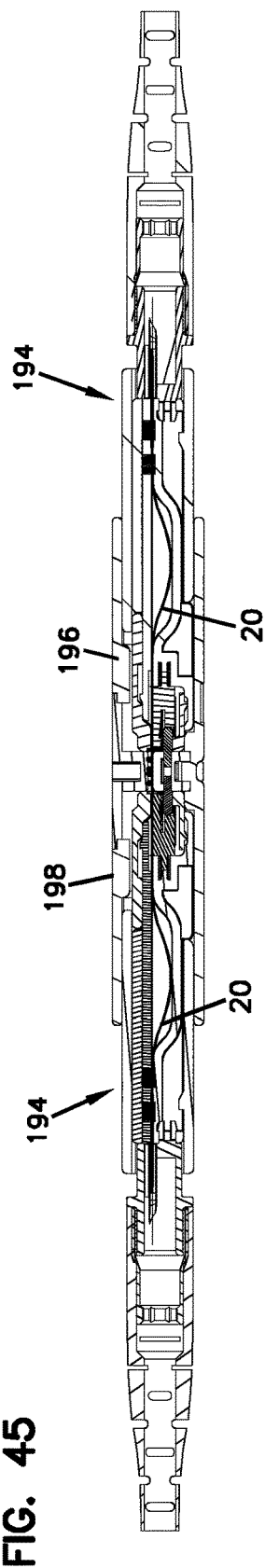
FIG. 45 is a cross-sectional view of the fiber optic connection system of FIG. 44, the cross-sectional view taken along line 45-45 of FIG. 44 that bisects the adapter and the male connectors.
Figure 46:
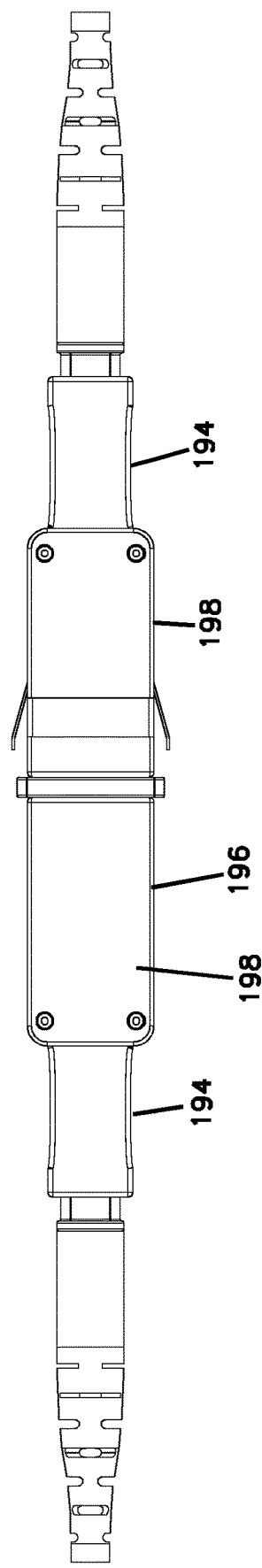
FIG. 46 is bottom view of the fiber optic connection system of FIGS. 44-45.
Figure 47:
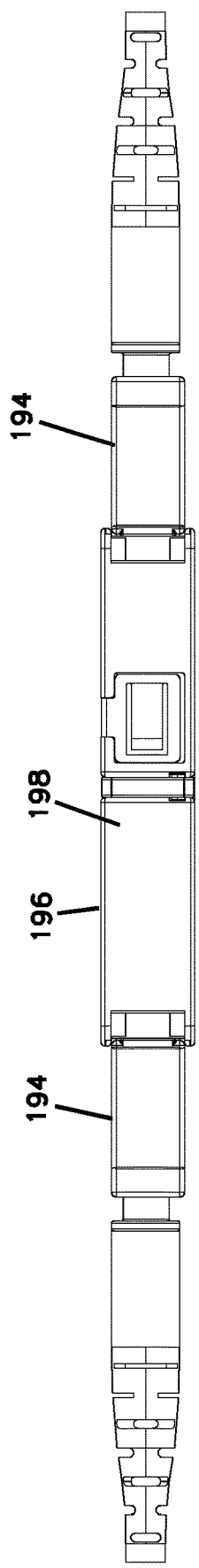
FIG. 47 illustrates a side view of the fiber optic connection system of FIGS. 44-46.

In FIG. 39, similar to the adapter 178 of FIGS. 35-28, a female connector 180 defining an angled housing 179 is shown. It should be noted that the female connector 180 includes features similar to those of the female connectors 16/152 of FIGS. 12-15 and 24-27 except for the angled housing. In this manner, the female connector 180 can mate with a male connector 184 that has fibers 20 protruding parallel to its longitudinal axis.

In certain embodiments, as will be described below, male connectors 194 with fibers 20 protruding straight, parallel to their longitudinal axes, may be used with non-angled adapter housings/bodies. Even though the downward angling of the fibers 20 may facilitate alignment in non-angled adapters, with the transversely extending rods of the fiber alignment structures of the adapters, the downward angling does not have to be utilized for aligning the fibers. For example, in FIGS. 40-47, an adapter 196 that has a non-angled body 198 is shown for aligning two male connectors 194 that have fibers 20 protruding parallel to their longitudinal axes.

It should be noted that although the previous examples of fiber optic connection systems described above have depicted the alignment of a single row of multi fibers 20, the principles disclosed herein can be used for aligning multiple rows of fibers 20.

FIGS. 48-55 illustrate a dual-layer connection system 200. In the depicted examples, a dual-layer male connector 202 and a dual-layer adapter 204 that is configured to mate two male connectors 202 are shown. It should be noted that the features of the adapter 204 may be provided on a dual-layered female connector. As shown, the dual-layered adapter 204 is provided with an angled housing 205, but the features are fully applicable to adapters having a non-angled housing, wherein the fibers 20 of the male or female connectors protrude at an angle instead.

Figure 50:
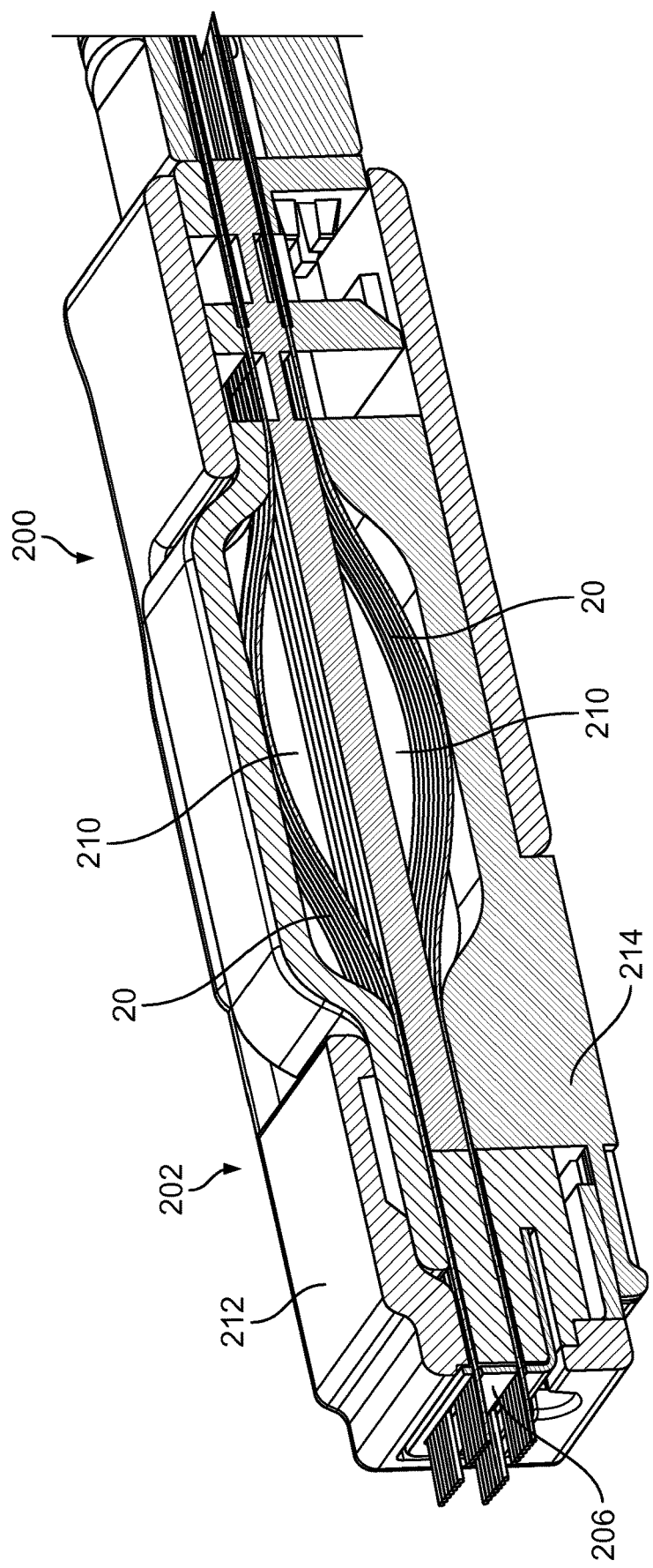
FIG. 50 is a close-up view illustrating the buckling regions of the dual-layered male connector of FIGS. 48-49.
Figure 51:
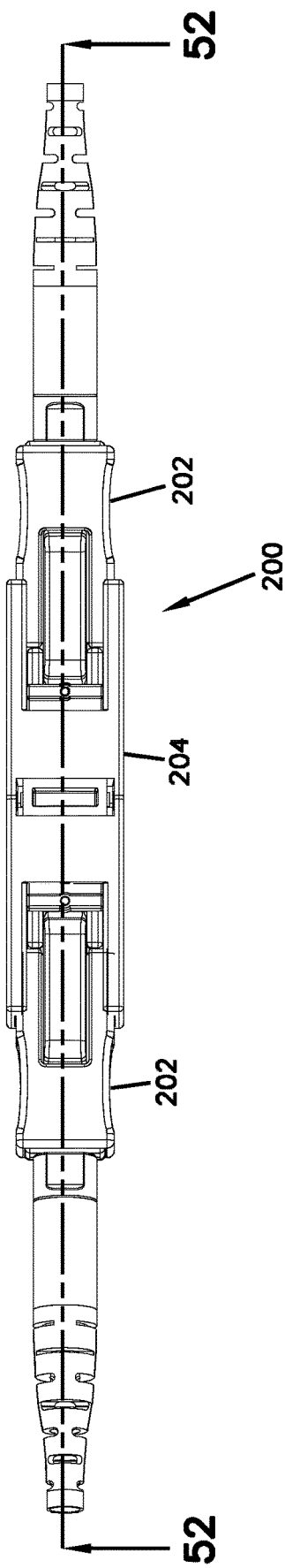
FIG. 51 is a top view of a fiber optic connection system utilizing the dual-layered male connectors of FIGS. 48-50 and a dual-layered adapter defining an angled body for mating the male connectors.
Figure 52:
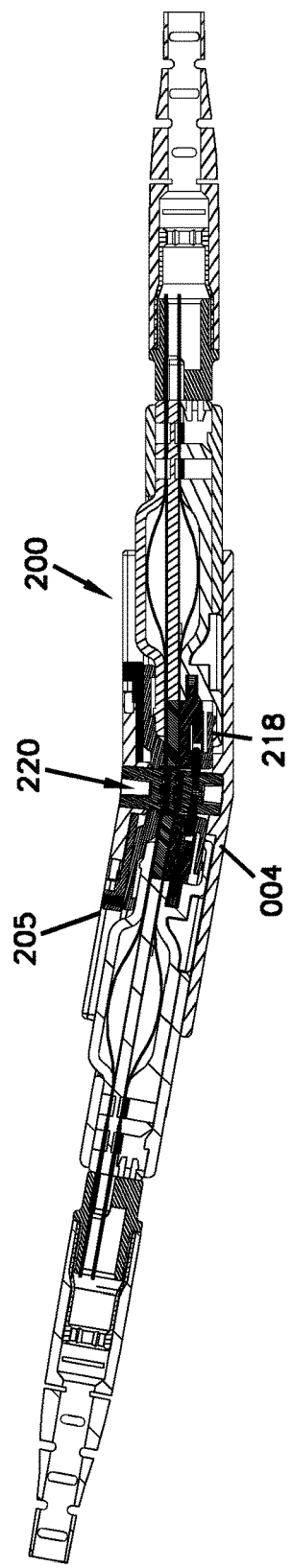
FIG. 52 is a cross-sectional view of the fiber optic connection system of FIG. 51, the cross-sectional view taken along line 52-52 of FIG. 51 that bisects the adapter and the male connectors.
Figure 53:
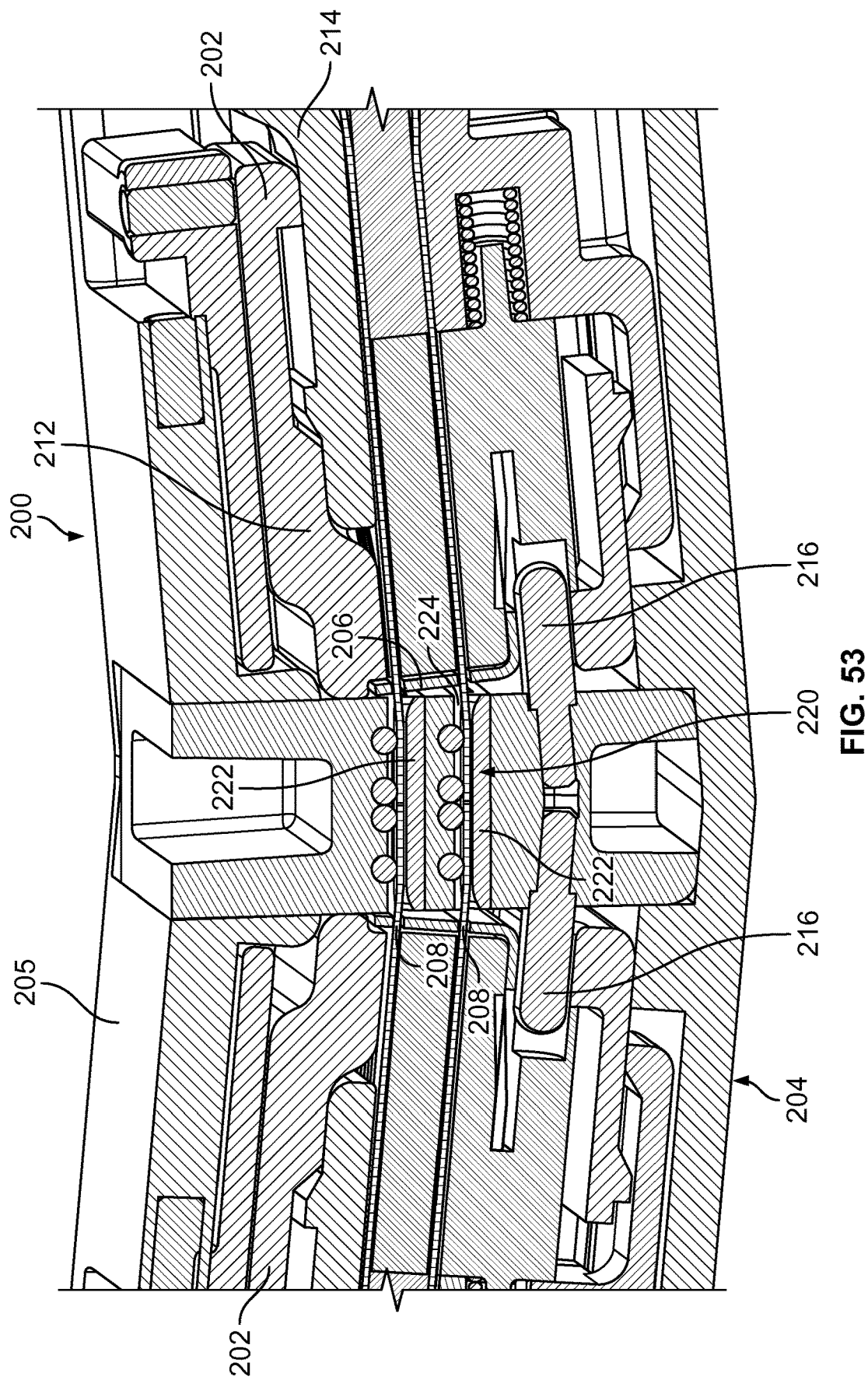
FIG. 53 is a close-up view of the fiber alignment portion of the adapter of FIGS. 51-52.
Figure 54:
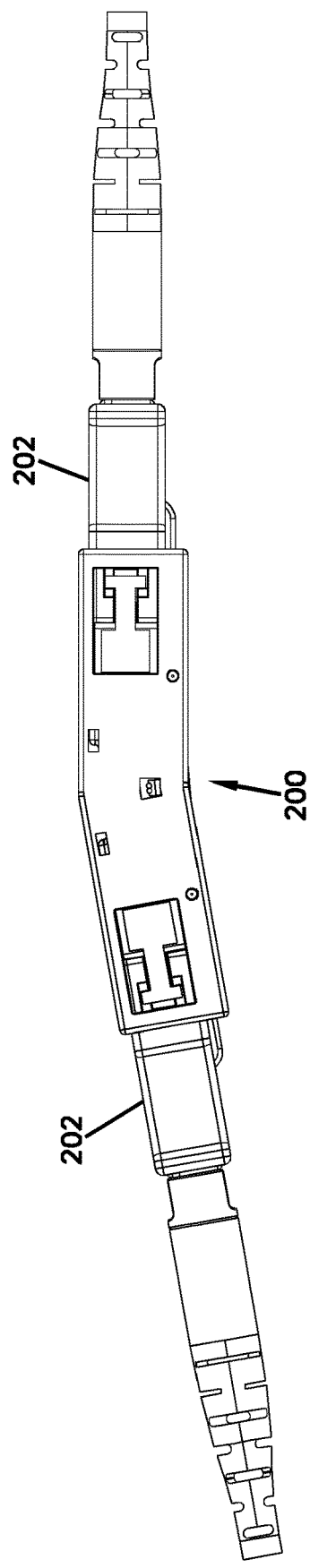
FIG. 54 is a side view of the fiber optic connection system of FIGS. 51-53.

Referring now to FIGS. 48-50, the dual-layered male connector 202 defines features similar to the single-layered male connectors 12/184/194 discussed with respect to FIGS. 1-47, except that the dual-layered male connector 202 defines a shutter 206 with two windows 208, one for each layer of fibers 20 protruding from the connector 202 and upper and lower buckling regions 210 for each of the fiber layers 20. It should be noted that the operation of the vertically moving shutter 206 and the relative movement between the shroud 212 and the connector inner housing 214 are similar to that discussed previously for the single layered version. One shutter key 216 (of either a dual-layered adapter or a dual-layered female connector) is used to vertically move both windows 208 of the shutter 206 into alignment. One deflection tab 218 (of either a dual-layered adapter or a dual-layered female connector) is used to allow movement of the shroud 212 with respect to the connector inner housing 214 that supports both layers of fibers 20.

Still referring to FIGS. 48-50, the dual-layered male connector 202 includes the shroud 212 that is formed from a shroud outer housing 203, a shroud inner housing base 225, and a shroud inner housing top part 207. A shroud spring 209 biases the shroud 212 forwardly. The connector inner housing 214 of the dual-layered male connector 202 is formed from a connector inner housing base 211, a connector inner housing mid section 213, and a connector inner housing top part 215.

Still referring to FIGS. 48-50, a connector sliding outer housing 217 is configured to slide with respect to the connector inner housing 214 similar to previous embodiments for latching/unlatching the male connector 202. A rear body 219 attaches a boot 221 to the connector inner housing 214 of the male connector 202. A crimp ring 223 may be provided adjacent the back end of the rear body 219.

Referring now to FIGS. 51-55, the dual-layered adapter 204 defines a fiber alignment region 220 with two fiber alignment structures 222 (defined by v-grooves 224) stacked on top of each other. Each fiber alignment structure 222 accommodates one of the fiber layers 20 of the dual-layered male connector 202.

FIGS. 56-65 illustrate an example of a fiber optic connection system 226 that is configured to align four rows of multiple fibers 20, providing a quad-layered system. In the depicted examples, a quad-layered adapter 228 that is configured to mate two male connectors 230 are shown. It should be noted that the features of the adapter 228 may be provided on a quad-layered female connector. According to one example embodiment, the fiber optic connection system 226 may be used to mate a total of 144 fibers, wherein each of the four rows of multiple fibers 20 include 36 fibers in a row.

In the depicted embodiment, the quad-layered adapter 228 is provided with a non-angled housing 232, but the features are fully applicable to adapters having an angled housing. It should also be noted that in the depicted embodiment, the fibers 20 of the male connectors 230 are shown to protrude straight, parallel to the longitudinal axes of the male connectors 230 even though the adapters 228 are provided with a non-angled housing 232.

As shown in FIGS. 56-59, the quad-layered adapter 228 may include certain features that are different than the previously described single- or dual-layered adapters. For example, the quad-layered adapter 228 may include a pair of spring-loaded shutters 234 at each end of the adapter 228 rather than a single magnetically-biased shutter at each end. The spring-loaded shutters 234 of the quad adapter 228 may pivot about a plane generally parallel to the top and bottom sides 236 of the adapter 228 versus the magnetic shutters of the single- and dual-layered adapters that pivot open about a plane that is generally parallel to the sidewalls of those adapters. The spring-loaded shutters 234 may provide the function of locking the quad male connectors to the adapter 228 once inserted therein instead of utilizing cantilever arms on the sidewalls of the adapter as discussed for previous embodiments. These types of locking shutters may be used on other examples of adapters or female connectors discussed above such as the single- or dual-layer components.

Further details relating to the spring-loaded shutters 234 of such adapters 228 are described in U.S. Provisional Patent Application No. 62/255,171, filed Nov. 13, 2015, which is incorporated herein by reference in its entirety.

Figure 55:
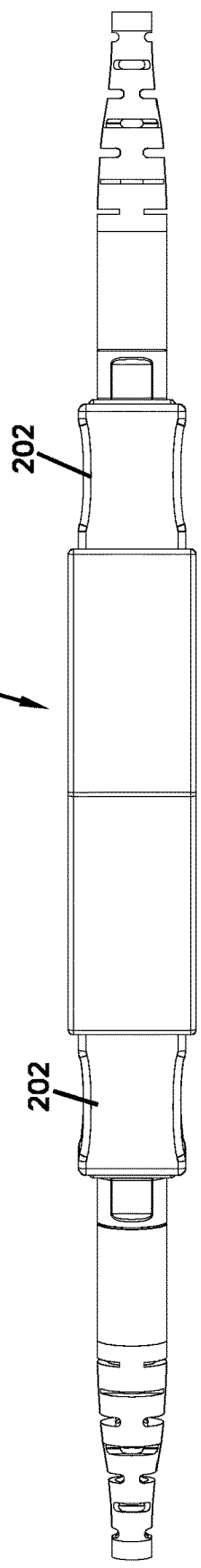
FIG. 55 is a bottom view of the fiber optic connection system of FIGS. 51-54.
Figure 59:
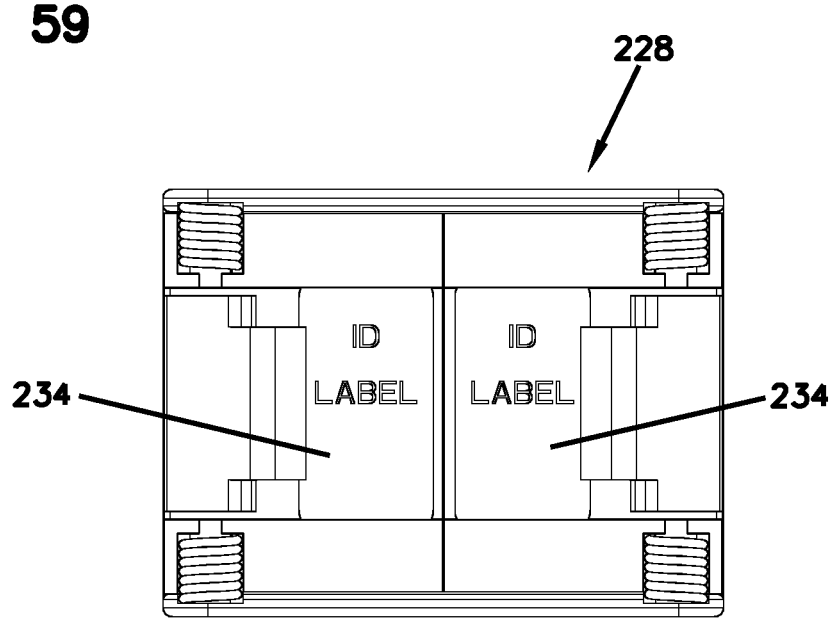
FIG. 59 is a front view of the adapter of FIGS. 56-58.
Figure 60:
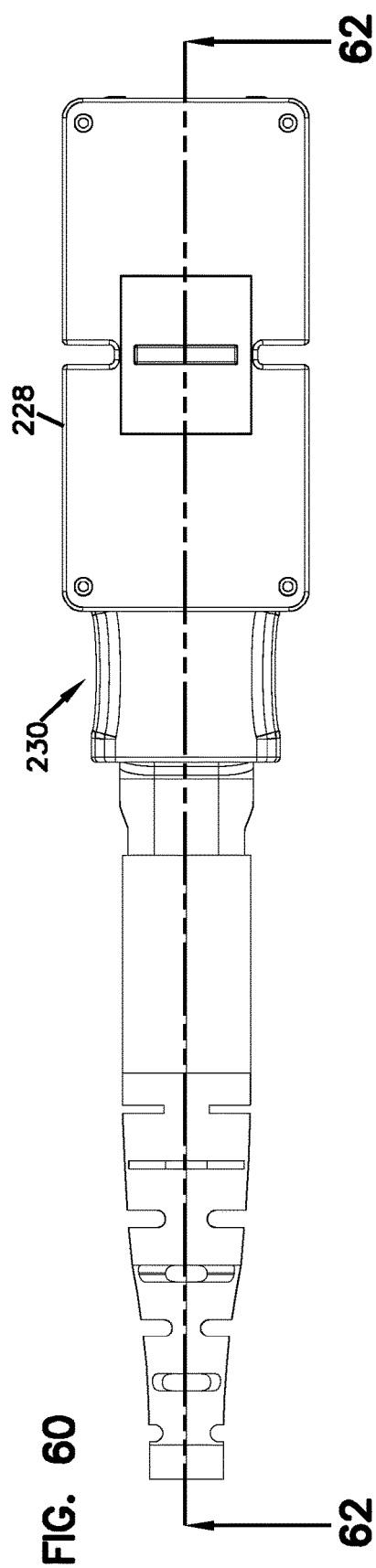
FIG. 60 illustrates a top view of a fiber optic connection system utilizing the quad-layered adapter of FIGS. 56-59 and a quad-layered male connector mated thereto.
Figure 61:
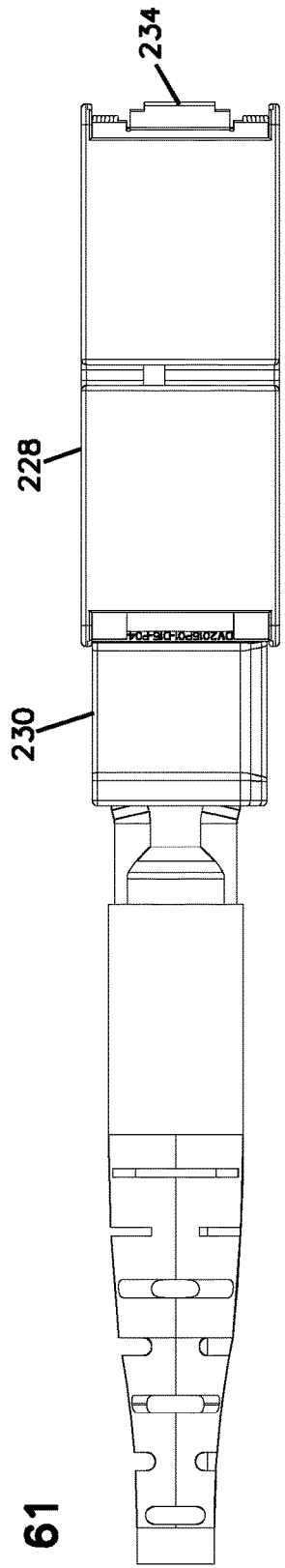
FIG. 61 is a side view of the fiber optic connection system of FIG. 60.
Figure 62:
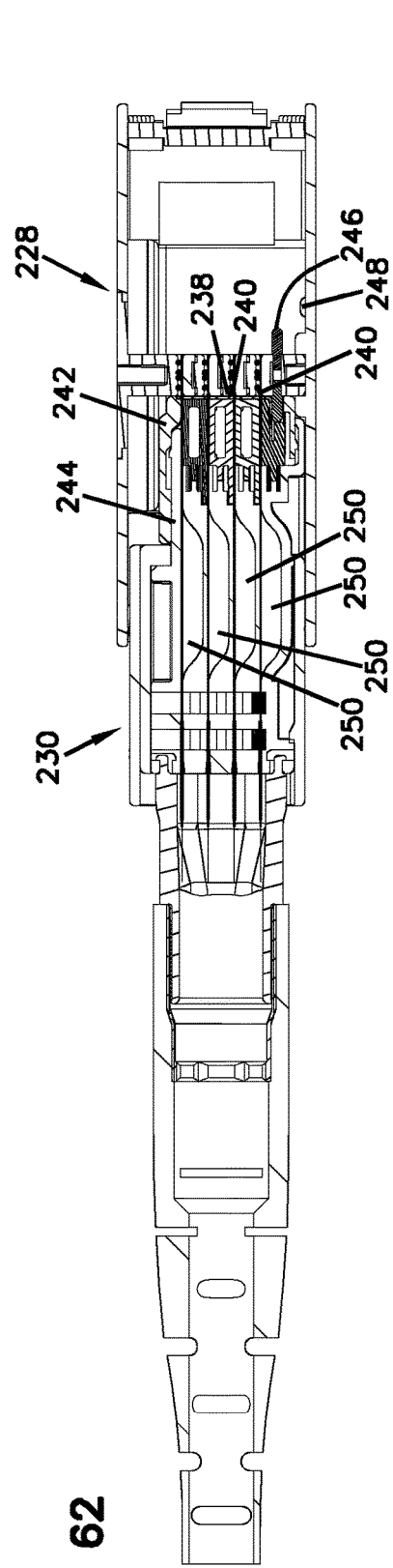
FIG. 62 is a cross-sectional view of the fiber optic connection system of FIGS. 60-61, the cross-sectional view taken along line 62-62 of FIG. 60 that bisects the adapter and the male connector mated thereto.
Figure 65A:
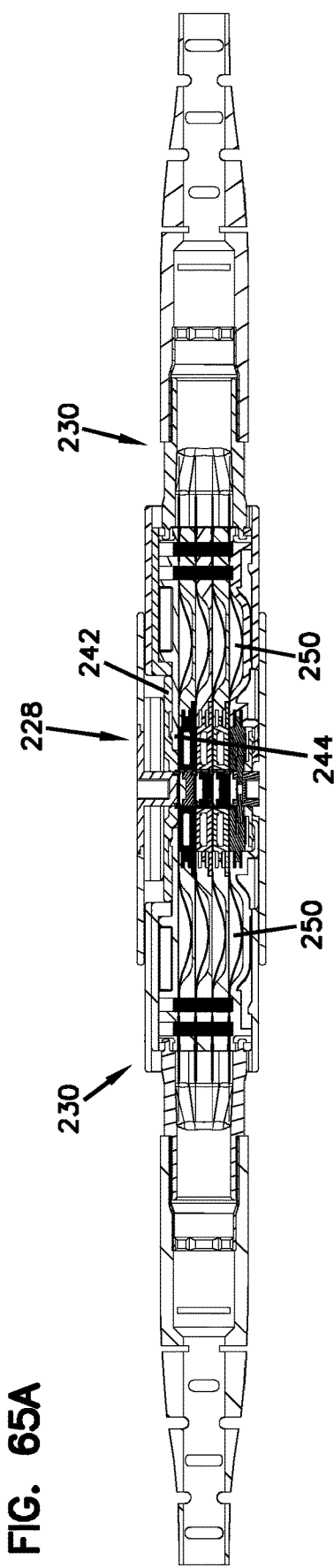
FIG. 65A is a cross-sectional view of the fiber optic connection system of FIGS. 63-64, the cross-sectional view taken along line 65A-65A of FIG. 63 that bisects the adapter and the male connectors mated therethrough.

The quad-layered male connectors 230 may define features similar to the single- or dual-layered male connectors discussed with respect to FIGS. 1-55 except that the quad-layered male connectors 230 may define shutters 238 with four windows 240, one for each layer of fibers 20 protruding from the connector 230. It should be noted that the operation of the vertically moving shutter 238 and the relative movement between the shroud 242 and the connector inner housing 244 are similar to that discussed previously for the single- or dual-layered versions. One shutter key 246 (of either a quad-layered adapter or a quad-layered female connector) is used to vertically move all four windows 240 of the shutter 238 into alignment. One deflection tab 248 (of either a quad-layered adapter or a quad-layered female connector) is used to allow movement of the shroud 242 with respect to the connector inner housing 244 that supports all four layers of fibers 20. Each male connector 230 may include four vertically stacked buckling regions 250 for each of the fiber layers 20 as shown in FIGS. 62 and 65.

Figure 65B:
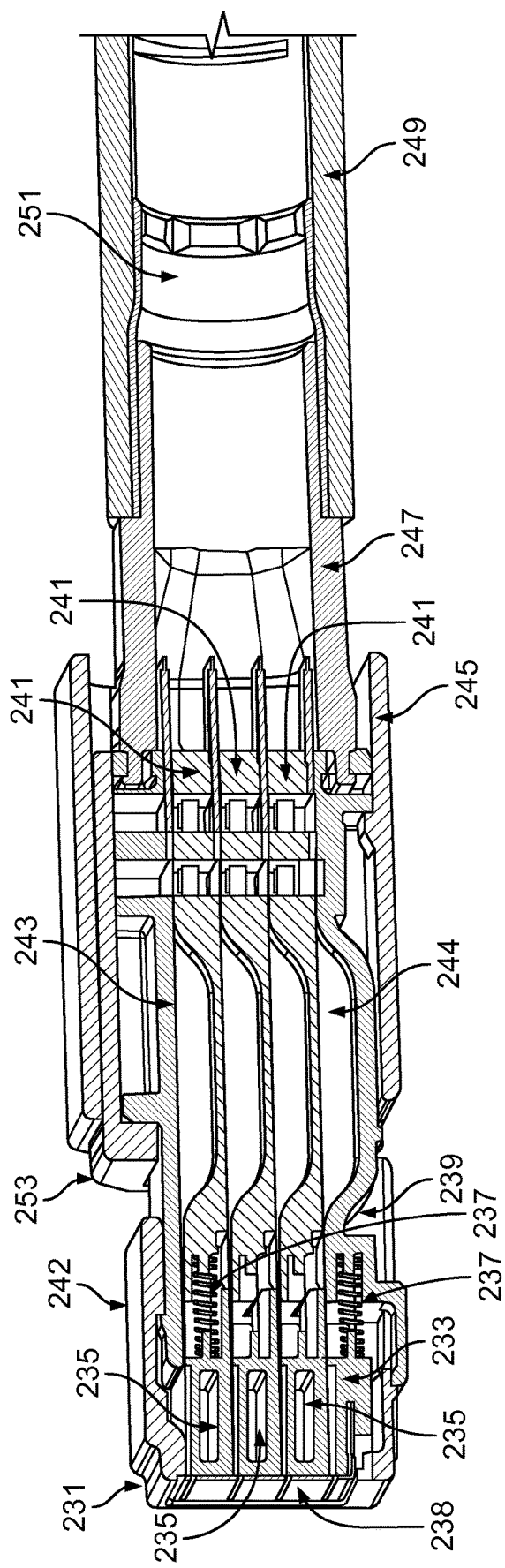
FIG. 65B illustrates a cross-sectional view of one of the quad-layered male connectors of FIG. 65A, wherein the cross-sectional view is taken along a line that bisects the male connector.
Figure 65C:
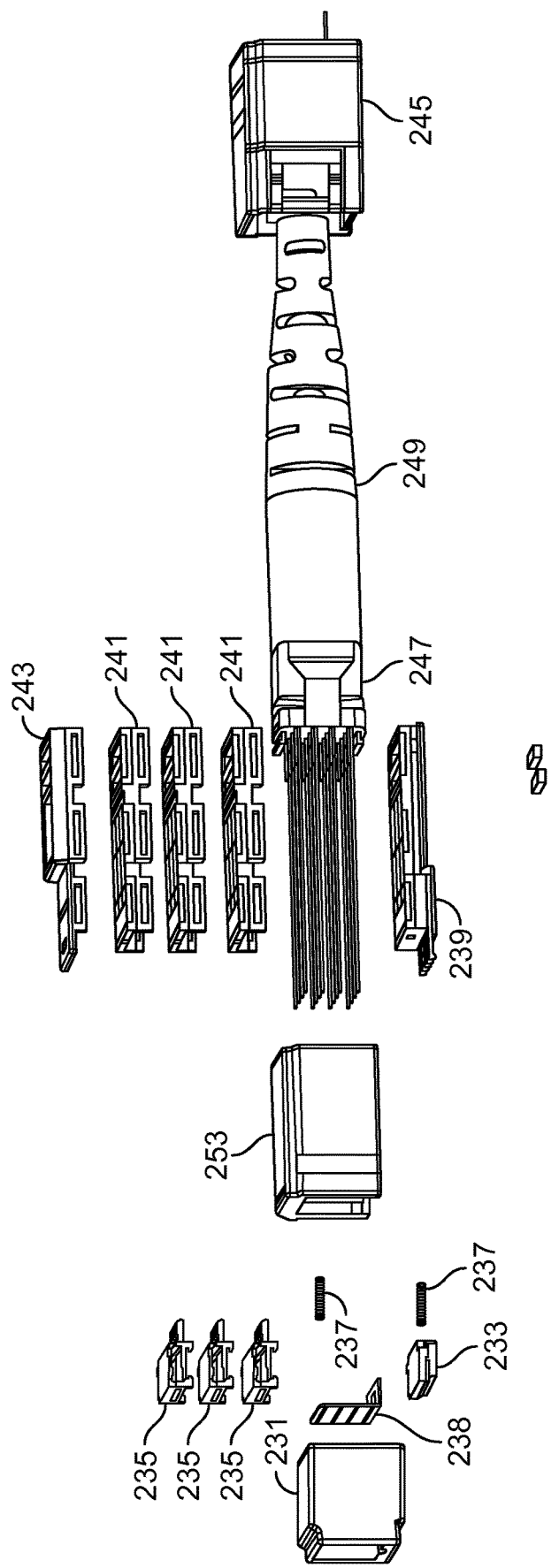
FIG. 65C illustrates the quad-layered male connector of FIG. 65B in an exploded configuration.
Figure 66:
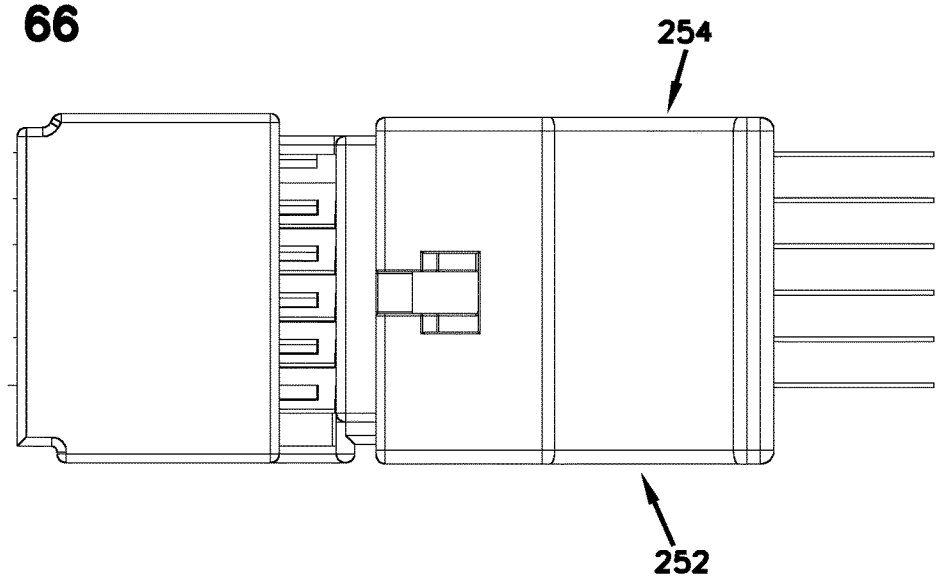
FIG. 66 is a side view of another embodiment of a first connection component in the form of a male connector, the male connector provided in the form of a 144-fiber connector defining six fiber layers, the male connector shown with both of the first shutter and the second shutter in a closed position.
Figure 67:
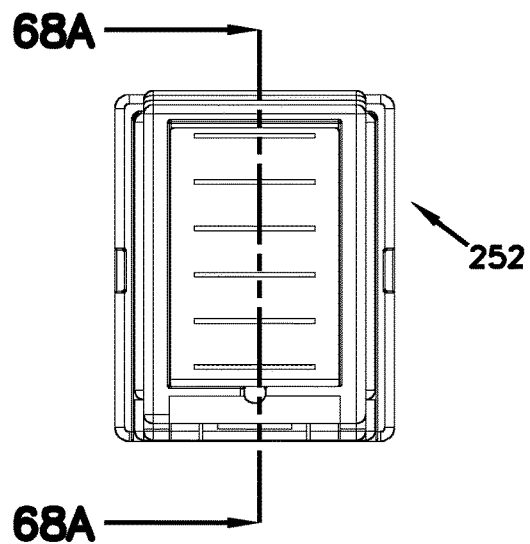
FIG. 67 is a front view of the 144-fiber male connector of FIG. 66.
Figure 68A:
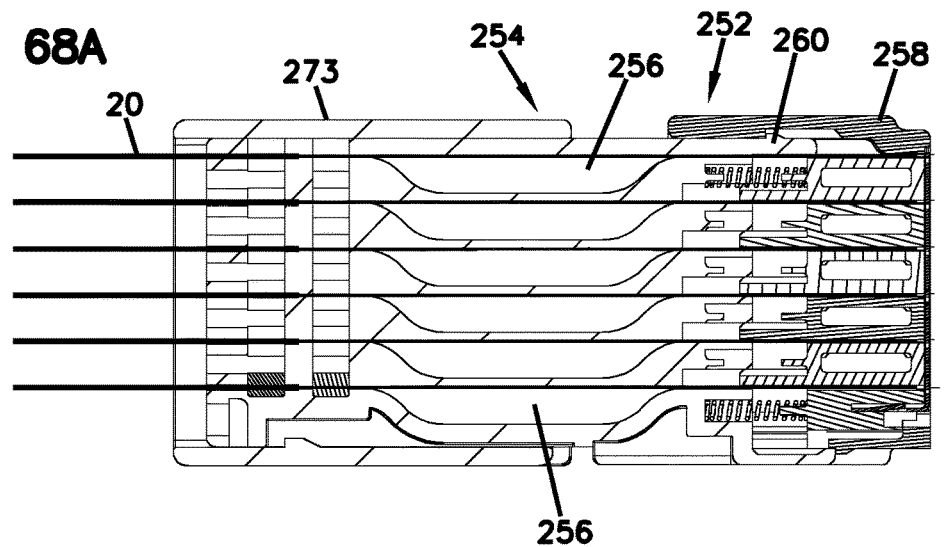
FIG. 68A is a cross-sectional view taken along line 68A-68A of FIG. 67.
Figure 68B:
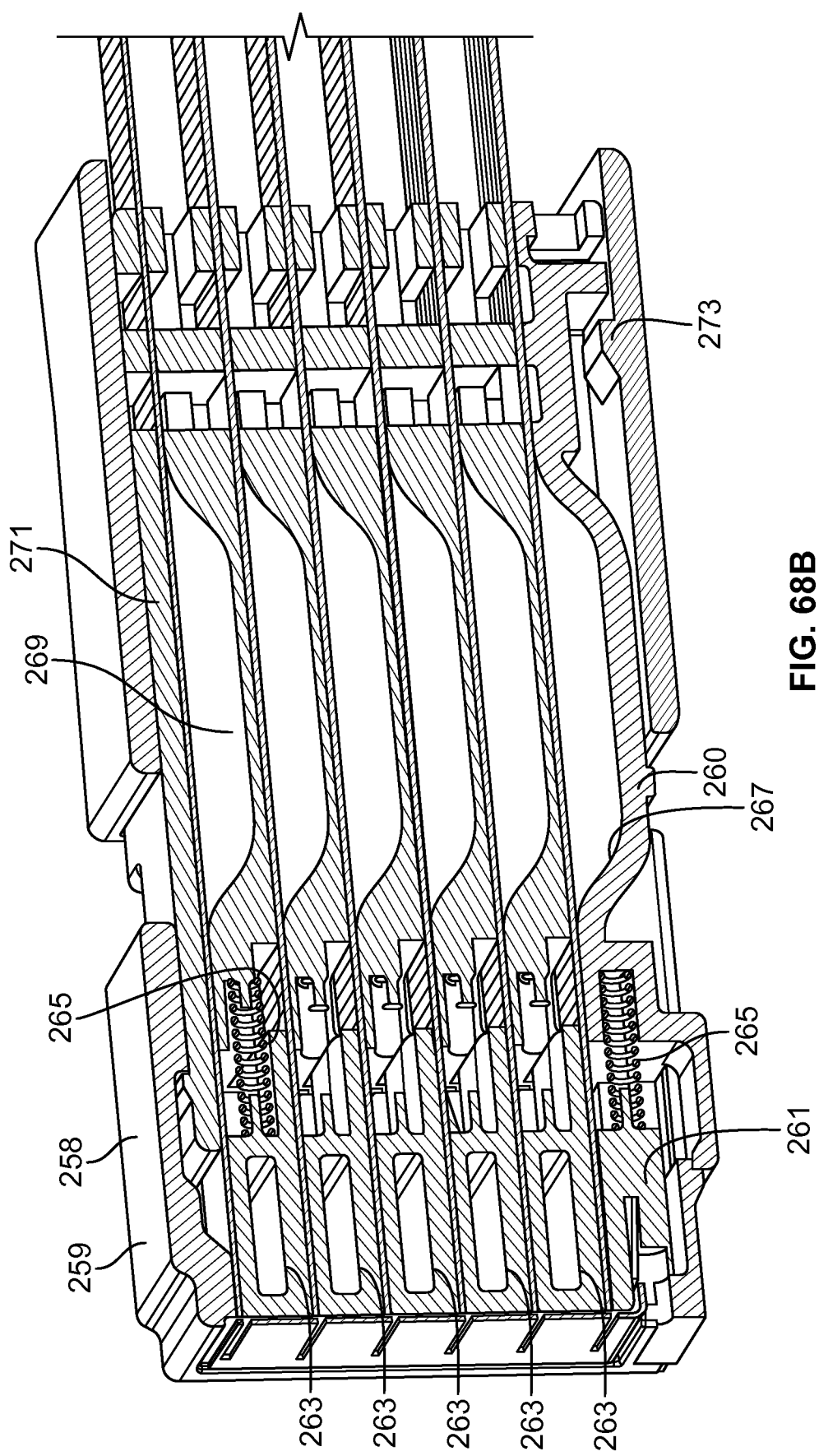
FIG. 68B is a perspective cross-sectional view of the 144-fiber male connector of FIG. 66 taken along a line bisecting the male connector.
Figure 69:
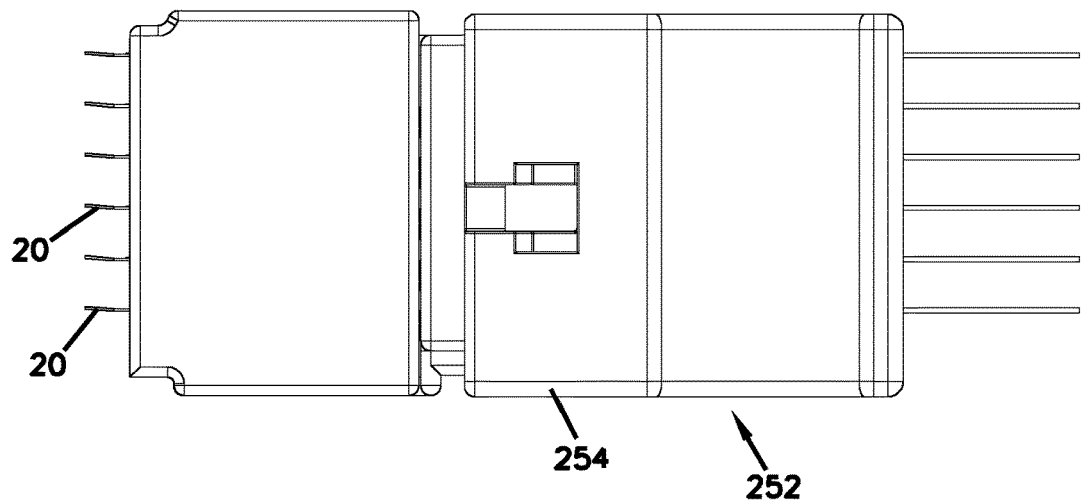
FIG. 69 illustrates the 144-fiber male connector of FIG. 66 with both the first shutter and the second shutter in an open position, exposing the optical fibers of the male connector for mating.
Figure 70:
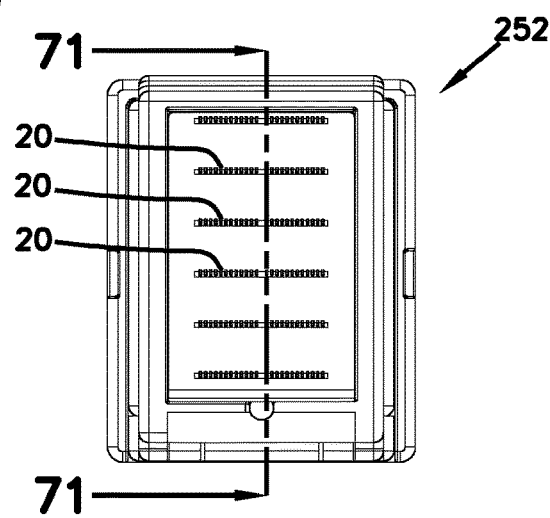
FIG. 70 is a front view of the 144-fiber male connector of FIG. 69.
Figure 71:
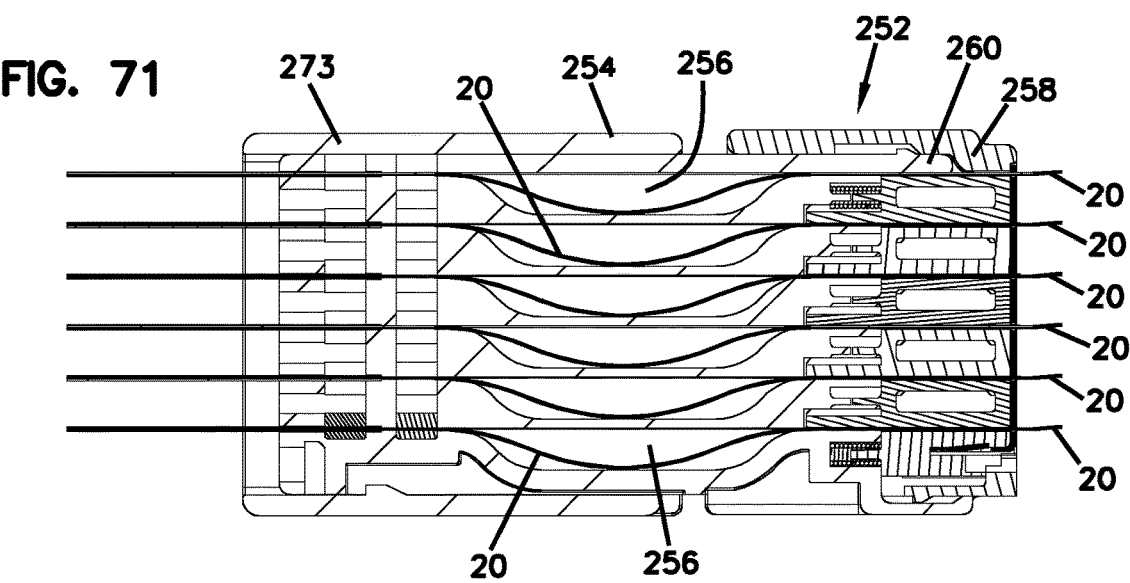
FIG. 71 is a cross-sectional view taken along line 71-71 of FIG. 70.

Referring now to FIGS. 65B and 65C, the quad-layered male connector 230 includes the shroud 242 that is formed from a shroud outer housing 231, a shroud inner housing base 233, and shroud inner housing mid sections 235. Shroud springs 237 bias the shroud 242 forwardly. The connector inner housing 244 of the quad-layered male connector 230 is formed from a connector inner housing base 239, connector inner housing mid sections 241, a connector inner housing top part 243, and a connector top 253.

Still referring to FIGS. 65B and 65C, a connector sliding outer housing 245 is configured to slide with respect to the connector inner housing 244 similar to previous embodiments for latching/unlatching the male connector 230. A rear body 247 attaches a boot 249 to the connector inner housing 244 of the male connector 230. A crimp ring 251 may be provided adjacent the back end of the rear body 247.

FIGS. 66-71 illustrate a fiber optic connection system 252 that can be used to mate 144-fiber connectors 254 (i.e., six rows of twenty-four fibers). The operation of such a system 252 is similar to those discussed above for single, dual, or quad-layered systems.

In FIGS. 66-71, the 144-fiber male connector 254 is shown, depicting six buckling regions 256, each defining buckling channels for accommodating twenty-four fibers 20 in each row to form the 144-fiber connection. The 144-fiber male connector 254 is shown with the fibers 20 protruding therefrom, with the shroud 258 having been pushed back with respect to the connector inner housing 260 in exposing the fibers.

Still referring to FIGS. 66-71, the 144-fiber male connector 254 includes the shroud 258 that is formed from a shroud outer housing 259, a shroud inner housing base 261, and a shroud inner housing mid section 263. Shroud springs 265 bias the shroud 258 forwardly. The connector inner housing 260 of the male connector 254 is formed from a connector inner housing base 267, a connector inner housing mid section 269, and a connector inner housing top part 271.

Still referring to FIGS. 66-71, a connector sliding outer housing 273 is configured to slide with respect to the connector inner housing 260 similar to previous embodiments for latching/unlatching the male connector 254.

Even though systems that can be used to mate up to 144-fiber connections have be disclosed, it should be noted that the inventive principles of the disclosure are applicable for mating more than 144 fibers. For examples, the male connectors, the female connectors, and the adapters of the present disclosure can be configured to mate 196, 288, or more fibers.

It should be noted that although certain specific examples of male connector, female connector, and adapter configurations have been disclosed, the inventive principles are not limited by the amount of fibers in a row or the number of rows as long as the structures of the disclosure are manufactured according to a desired connectivity solution.

The above specification, examples and data provide a complete description of the manufacture and use of the composition of the inventive features. Since many embodiments of the disclosure can be made without departing from the spirit and scope of the inventive features, the inventive features reside in the claims hereinafter appended.

REFERENCE NUMERALS

10 Fiber optic connection system
12 First fiber optic connection component/male fiber optic connector
14 First fiber optic cable
16 Second fiber optic connection component/female fiber optic connector
18 Second fiber optic cable
20 Optical fiber
22 Shroud
23 Connector sliding outer housing
24 Connector inner housing
25 Shroud outer housing
26 Shroud inner housing
27 Connector inner housing base part
28 Front end of outer housing
29 Connector inner housing top part
30 Upper wall
32 Upper surface of shroud inner housing
34 Interior surface of upper wall
36 First shutter
38 Vertical portion of shutter
40 Horizontal portion of shutter
42 Shutter window
44 Pocket
46 Keyhole
48 Shutter key/pin
50 Locking feature
52 Sidewall
54 Ramp
56 Cantilever arm
58 Outer housing window
60 Protruding portion
62 Buckling region/cavity
64 Potting area
66 Back of connector inner housing
68 Spring
70 Spring pocket
72 Upper tab
74 Stop surface
76 Front end of connector inner housing
78 Upper wall of connector inner housing
80 End
82 Pocket
84 Lower tab
86 Stop surface
88 Rear wall of connector inner housing
90 Shroud lock
91 Tab
92 Bottom wall
94 Lower wall of shroud outer housing
96 Catch
98 Deflection feature/tab
99 Lifting arm
100 Second shutter
102 Channel
104 Housing of female connector
106 Sidewall
108 Interior of housing
110 Fiber fixation portion
112 Rear end
114 Fiber alignment portion
116 Fiber alignment structure
118 V-groove/channel
120 Rod
122 Third shutter
124 Magnet
126 Abutment surface
128 Convex front end
130 Inner surface of locking arm
132 Adapter
134 Shutter
136 Fiber alignment region
138 Deflection tab
140 Shutter key/pin
142 Fiber alignment structure
144 V-groove
146 Outer transverse cylindrical rod
148 Inner transverse cylindrical rod
150 Cantilever arm
152 Female connector
154 Fiber alignment structure
156 V-groove
158 Outer transverse cylindrical rod
160 Inner transverse cylindrical rod
162 Adapter
164 Housing
166 Male connector
168 Buckling region
170 Connector inner housing
171 Shroud outer housing
172 Shroud
173 Connector sliding outer housing
174 Upper wall
175 Shroud inner housing base
176 Housing/body
177 Shroud inner housing top part
178 Adapter
179 Shroud spring
180 Female connector
181 Connector inner housing base
182 System
183 Connector inner housing top part
184 Male connector
185 Connector top
186 Shroud inner housing base
187 Rear body
188 Upper surface
189 Boot
190 Sidewall
191 Crimp ring
192 V-groove
194 Male connector
196 Adapter
198 Non-angled body
200 Dual-layer connection system
202 Dual-layer male connector 203 Shroud outer housing
204 Dual-layer adapter
205 Angled housing
206 Shutter
207 Shroud inner housing top part
208 Window
209 Shroud spring
210 Buckling region
211 Connector inner housing base
212 Shroud
213 Connector inner housing mid section
214 Connector inner housing
215 Connector inner housing top part
216 Shutter key
217 Connector sliding outer housing
218 Deflection tab
219 Rear body
220 Fiber alignment region
221 Boot
222 Fiber alignment structure
223 Crimp ring
224 V-groove
225 Shroud inner housing base
226 Fiber optic connection system
228 Quad-layered adapter
230 Male connector
231 Shroud outer housing
232 Non-angled housing
233 Shroud inner housing base
234 Spring-loaded shutter
235 Shroud inner housing mid section
236 Top/bottom side
237 Shroud spring
238 Shutter
239 Connector inner housing base
240 Window
241 Connector inner housing mid section
242 Shroud
243 Connector inner housing top part
244 Connector inner housing
245 Connector sliding outer housing
246 Shutter key
247 Rear body
248 Deflection tab
249 Boot
250 Buckling region
251 Crimp ring
252 Fiber optic connection system
253 Connector top
254 144-fiber male connector
256 Buckling region
258 Shroud
259 Shroud outer housing
260 Connector inner housing
261 Shroud inner housing base
263 Shroud inner housing mid section
265 Shroud spring
267 Connector inner housing base
269 Connector inner housing mid section
271 Connector inner housing top part
273 Connector sliding outer housing

What is claimed is:

1. A fiber optic connection system comprising:
a first connection component with at least one fiber of a first fiber optic cable axially fixed to a portion of a housing of the first connection component, the housing defining a longitudinal axis;
the first connection component including a first shutter, at least a portion of which is movable in a direction generally perpendicular to the longitudinal axis, the movable portion of the first shutter biased downwardly in a direction along the direction generally perpendicular to the longitudinal axis from a top side of the housing of the first connection component toward a bottom side of the housing of the first connection component to a closed position, wherein the at least one fiber of the first fiber optic cable is prevented from exposure by the movable portion of the first shutter when the movable portion of the first shutter is in the closed position, the movable portion of the first shutter configured to be moved to an open position upwardly in a direction generally along the direction perpendicular to the longitudinal axis from the bottom side of the housing of the first connection component toward the top side of the housing of the first connection component against a bias via contact by a second connection component that is different than the first connection component;
the first connection component including a second shutter that is slidably movable in a direction generally parallel to the longitudinal axis, the second shutter biased to a closed position so as to prevent the at least one fiber of the first fiber optic cable from protruding from the first connection component, wherein the first connection component is defined by a male connector such that the at least one fiber of the first fiber optic cable protrudes from the male connector when the movable portion of the first shutter and the slidably movable second shutter are both brought to an open position, wherein at least a portion of the second shutter is slidably movable over the portion of the housing of the first connection component to which the at least one fiber is axially fixed.

2. A fiber optic connection system according to claim 1, further comprising the second connection component that is configured to physically mate with the first connection component for the purpose of optically aligning the at least one fiber of the first fiber optic cable with at least one fiber of a second fiber optic cable, the second connection component configured to move both the first shutter and the second shutter to the open position when coupled to the first connection component for exposing the at least one fiber of the first fiber optic cable for optical alignment.

3. A fiber optic connection system according to claim 2, wherein the second connection component defines a third shutter that is pivotally opened when the first connection component is physically mated with the second connection component.

4. A fiber optic connection system according to claim 3, wherein the third shutter is biased closed by a spring.

5. A fiber optic connection system according to claim 3, wherein the third shutter is biased closed by magnetic force.

6. A fiber optic connection system according to claim 2, wherein the second connection component includes a fiber alignment structure defining at least one alignment groove.

7. A fiber optic connection system according to claim 6, wherein the at least one alignment groove is defined by a v-shaped groove.

8. A fiber optic connection system according to claim 7, wherein the fiber alignment structure defines at least one cylindrical rod extending generally transverse to the v-shaped groove for biasing the at least one fiber of the first fiber optic cable toward the v-shaped groove.

9. A fiber optic connection system according to claim 2, wherein the second connection component is defined by a female connector terminating the second fiber optic cable such that the at least one fiber of the second fiber optic cable is fixed axially with respect to the female connector.

10. A fiber optic connection system according to claim 2, wherein the second connection component is defined by an adapter that is configured to optically intermate two first connection components, wherein the adapter is configured to move both the first and second shutters of each of the two first connection components to the open position when the first connection components are physically coupled to the adapter.

11. A fiber optic connection system according to claim 1, wherein the first connection component terminates a plurality of fibers of the first fiber optic cable.

12. A fiber optic connection system according to claim 11, wherein the plurality of fibers includes at least eight fibers provided in a row.

13. A fiber optic connection system according to claim 11, wherein the plurality of fibers includes at least two vertical layers of fibers.

14. A fiber optic connection system according to claim 1, wherein the housing of the first connection component defines a fiber buckling region for accommodating macro-bending of the at least one fiber when the first connection component is mated to the second connection component so as to optically align the at least one fiber of the first fiber optic cable with at least one fiber of a second fiber optic cable.

15. A fiber optic connection system according to claim 11, wherein the housing of the first connection component defines a fiber buckling region for accommodating macro-bending of the plurality of fibers when the first connection component is mated to the second connection component so as to optically align the plurality of fibers of the first fiber optic cable with a plurality of fibers of a second fiber optic cable.

16. A fiber optic connection system according to claim 1, wherein both the first shutter and the second shutter are biased closed by spring force.

17. A fiber optic connector comprising:
  at least one fiber of a first fiber optic cable axially fixed to a portion of a housing of the fiber optic connector, the housing defining a longitudinal axis;
  the fiber optic connector including a first shutter, at least a portion of which is movable in a direction generally perpendicular to the longitudinal axis, the movable portion of the first shutter biased downwardly in a direction along the direction generally perpendicular to the longitudinal axis from a top side of the housing of the fiber optic connector toward a bottom side of the housing of the fiber optic connector to a closed position, wherein the at least one fiber of the first fiber optic cable is prevented from exposure by the movable portion of the first shutter when the movable portion of the first shutter is in the closed position, the movable portion of the first shutter configured to be moved to an open position upwardly in a direction generally along the direction perpendicular to the longitudinal axis from the bottom side of the housing of the fiber optic connector toward the top side of the housing of the fiber optic connector against a bias via contact by either a second fiber optic connector that is different than the fiber optic connector or by a fiber optic adapter;
  the fiber optic connector including a second shutter that is slidably movable in a direction generally parallel to the longitudinal axis, the second shutter biased to a closed position so as to prevent the at least one fiber of the first fiber optic cable from protruding from the fiber optic connector, wherein the fiber optic connector is defined by a male connector such that the at least one fiber of the first fiber optic cable protrudes from the male connector when the movable portion of the first shutter and the slidably movable second shutter are both brought to an open position, wherein at least a portion of the second shutter is slidably movable over the portion of the housing of the fiber optic connector to which the at least one fiber is axially fixed.

18. A fiber optic connector according to claim 17, wherein the fiber optic connector terminates a plurality of fibers of the first fiber optic cable.

19. A fiber optic connector according to claim 18, wherein the plurality of fibers includes at least eight fibers provided in a row.

20. A fiber optic connector according to claim 18, wherein the plurality of fibers includes at least two vertical layers of fibers.

21. A fiber optic connector according to claim 17, wherein the housing of the fiber optic connector defines a fiber buckling region for accommodating macro-bending of the at least one fiber when the fiber optic connector is mated to the second fiber optic connector so as to optically align the at least one fiber of the first fiber optic cable with at least one fiber of a second fiber optic cable.

22. A fiber optic connector according to claim 18, wherein the housing of the fiber optic connector defines a fiber buckling region for accommodating macro-bending of the plurality of fibers when the fiber optic connector is mated to the second fiber optic connector so as to optically align the plurality of fibers of the first fiber optic cable with a plurality of fibers of a second fiber optic cable.

23. A fiber optic connector according to claim 17, wherein both the first shutter and the second shutter are biased closed by spring force.

24. A fiber optic connector according to claim 17, wherein the second shutter defines a catch that is configured to contact a portion of the housing of the fiber optic connector to prevent slidable movement of the second shutter unless the catch is flexed to disengage from the portion of the housing contacting the catch.

25. A fiber optic connection system according to claim 1, wherein the second shutter defines a catch that is configured to contact a portion of the housing of the first connection component to prevent slidable movement of the second shutter unless the catch is flexed to disengage from the portion of the housing contacting the catch.

26. A fiber optic connection component comprising:
  a housing for physically mating with a housing of another fiber optic connection component terminating at least one fiber of a first fiber optic cable;
  a first contact structure for directly contacting and moving a first shutter of the another fiber optic connection component in a direction generally perpendicular to a longitudinal axis of the housing of the another fiber optic connection component;
  a second contact structure for directly contacting and slidably moving a second shutter of the another fiber optic connection component in a direction generally along the longitudinal axis of the housing of the another fiber optic connection component for allowing the at least one fiber of the first fiber optic cable to protrude forwardly from the housing of the another fiber optic connection component to an exterior of the another fiber optic connection component; and a fiber alignment structure defining at least one fiber alignment groove for receiving the at least one fiber of the first fiber optic cable that is protruding forwardly from the housing of the another fiber optic connection component to the exterior of the another fiber optic connection component.

27. A fiber optic connection component according to claim 26, further comprising a third contact structure for directly contacting and releasing a catch of the another fiber optic connection component for allowing movement of the second shutter of the another fiber connection component.

28. A fiber optic connection component according to claim 26, wherein the fiber optic connection component terminates at least one fiber of a second fiber optic cable that is configured for optically mating with the at least one fiber of the first fiber optic cable.

29. A fiber optic connection component according to claim 26, wherein the fiber optic connection component defines an adapter for physically mating with and optically aligning two of the another fiber optic connection components.

30. A fiber optic connection component according to claim 29, wherein the adapter defines the first and second contact structures.

* * * * *